US010263253B2

(12) United States Patent
Nair et al.

(10) Patent No.: US 10,263,253 B2
(45) Date of Patent: Apr. 16, 2019

(54) METHOD OF PREPARING A VANADIUM OXIDE COMPOUND AND USE THEREOF IN ELECTROCHEMICAL CELLS

(71) Applicant: Nanyang Technological University, Singapore (SG)

(72) Inventors: Vivek Nair, Singapore (SG); Madhavi Srinivasan, Singapore (SG); Yan Ling Cheah, Singapore (SG)

(73) Assignee: NANYANG TECHNOLOGICAL UNIVERSITY, Singapore (SG)

( * ) Notice: Subject to any disclaimer, the term of this patent is extended or adjusted under 35 U.S.C. 154(b) by 613 days.

(21) Appl. No.: 14/761,581

(22) PCT Filed: Feb. 4, 2014

(86) PCT No.: PCT/SG2014/000044
§ 371 (c)(1),
(2) Date: Jul. 16, 2015

(87) PCT Pub. No.: WO2014/120096
PCT Pub. Date: Aug. 7, 2014

(65) Prior Publication Data
US 2016/0006028 A1  Jan. 7, 2016

Related U.S. Application Data

(60) Provisional application No. 61/760,347, filed on Feb. 4, 2013.

(51) Int. Cl.
*H01M 4/485* (2010.01)
*H01M 10/36* (2010.01)
(Continued)

(52) U.S. Cl.
CPC ............ *H01M 4/485* (2013.01); *C01G 31/00* (2013.01); *C01G 31/006* (2013.01); *H01M 4/04* (2013.01);
(Continued)

(58) Field of Classification Search
CPC ... C01G 31/00; C01G 31/006; C01P 2002/72; C01P 2004/03; C01P 2004/04;
(Continued)

(56) References Cited

U.S. PATENT DOCUMENTS

2004/0048156 A1* 3/2004 Thackeray .............. H01M 4/13
429/219
2007/0287061 A1 12/2007 Guyomard et al.
(Continued)

FOREIGN PATENT DOCUMENTS

CN  101880058 A  11/2010
WO  00/44673 A1  8/2000

OTHER PUBLICATIONS

Avansi Jr. et al., "An efficient synthesis route of $Na_2V_6O_{16} \cdot n\ H_2O$ nanowires in hydrothermal conditions," *Materials Chemistry and Physics* 127:56-61, 2011.
(Continued)

*Primary Examiner* — Barbara L Gilliam
*Assistant Examiner* — Adam A Arciero
(74) *Attorney, Agent, or Firm* — Seed IP Law Group LLP

(57) ABSTRACT

Electrochemical cell comprising an anode and a cathode is provided. The anode and the cathode independently comprises or consists essentially of a vanadium oxide compound having general formula $M_nV_6O_{16}$, wherein M is selected from the group consisting of ammonium, alkali-metal, and alkaline-earth metal; and n is 1 or 2. Method of preparing a vanadium oxide compound having general formula $M_nV_6O_{16}$ is also provided.

20 Claims, 19 Drawing Sheets

(51) Int. Cl.
| | |
|---|---|
| H01M 4/62 | (2006.01) |
| H01M 4/04 | (2006.01) |
| C01G 31/00 | (2006.01) |
| H01M 4/48 | (2010.01) |
| C25B 11/04 | (2006.01) |

(52) U.S. Cl.
CPC ........... *H01M 4/0471* (2013.01); *H01M 4/48* (2013.01); *H01M 4/623* (2013.01); *H01M 4/625* (2013.01); *H01M 10/36* (2013.01); *C01P 2002/72* (2013.01); *C01P 2004/03* (2013.01); *C01P 2004/04* (2013.01); *C01P 2004/10* (2013.01); *C01P 2004/16* (2013.01); *C01P 2004/17* (2013.01); *C01P 2004/20* (2013.01); *C01P 2004/64* (2013.01); *C01P 2006/40* (2013.01); *C25B 11/0489* (2013.01); *H01M 4/624* (2013.01); *H01M 2220/20* (2013.01); *H01M 2220/30* (2013.01)

(58) Field of Classification Search
CPC .............. C01P 2004/10; C01P 2004/16; C01P 2004/17; C01P 2004/20; C01P 2004/64; C01P 2006/40; C25B 11/0489; H01M 10/36; H01M 2220/20; H01M 2220/30; H01M 4/04; H01M 4/0471; H01M 4/485; H01M 4/48; H01M 4/623; H01M 4/624; H01M 4/625
See application file for complete search history.

(56) References Cited

U.S. PATENT DOCUMENTS

| | | | | |
|---|---|---|---|---|
| 2009/0081529 | A1* | 3/2009 | Thackeray | H01M 4/131 429/52 |
| 2010/0176337 | A1* | 7/2010 | Zhamu | H01M 4/1391 252/182.1 |
| 2012/0321953 | A1* | 12/2012 | Chen | C01G 31/00 429/219 |

OTHER PUBLICATIONS

Ban et al., "Electrospun nano-vanadium pentoxide cathode," *Electrochemistry Communications* 11:522-525, 2009.
Broussely et al., "Lithium-ion batteries for electric vehicles: performances of 100 Ah cells," *Journal of Power Sources* 68:8-12, 1997.
Cheah et al., "Morphology, structure and electrochemical properties of single phase electrospun vanadium pentoxide nanofibers for lithium ion batteries," *Journal of Power Sources* 196:6465-6472, 2011.
Cheary et al., "A Fundamental Parameters Approach to X-ray Line-Profile Fitting," *J. Appl. Cryst.* 25:109-121, 1992.
Chernova et al., "Layered vanadium and molybdenum oxides: batteries and electrochromics," *J. Mater. Chem.* 19:2526-2552, 2009.
Chiang, "Building a Better Battery," *Science* 330:1485-1486, 2010.
Duduta et al., "Semi-Solid Lithium Rechargeable Flow Battery," *Adv. Energy Mater.* 1:511-516, 2011.
Dunn et al., "Electrical Energy Storage for the Grid: A Battery of Choices," *Science* 334:928-935, Nov. 18, 2011.
Fiore et al., "Redox Potentials of Vanadium-containing Couples. Part 3. The Formal Redox Potential of the $V^{3+}$-$V^{2+}$ Couple," *J. Chem. Soc. Dalton Trans.*:799-802, 1993.
Frost, "Developments in lead-acid batteries: a lead producer's perspective," *Journal of Power Sources* 78: 256-266, 1999.
Gifford et al., "Development of advanced nickel/metal hydride batteries for electric and hybrid vehicles," *Journal of Power Sources* 80:157-163, 1999.

Jansen et al., "Development of a high-power lithium-ion battery," *Journal of Power Sources* 81-82:902-905, 1999.
Jiang et al., "Structural and Electrochemical Studies on β-Li$_x$V$_2$O$_5$ as Cathode Material for Rechargeable Lithium Batteries," *J. Phys. Chem. C* 111:10707-10711, 2007.
Kawakita et al., "Comparison of Na$_{1+x}$V$_3$O$_8$ with Li$_{1+x}$V$_3$O$_8$ as lithium insertion host," *Solid State Ionics* 124:21-28, 1999.
Kawakita et al., "Effect of crystallinity on lithium insertion behavior of Na$_{1+x}$V$_3$O$_8$," *Solid State Ionics* 124:29-35, 1999.
Kawakita et al., "Preparation and lithium insertion behaviour of oxygen-deficient Li$_{1+x}$V$_3$O$_{8-\delta}$," *Journal of Power Sources* 66:135-139, 1997.
Köhler et al., "LiV$_3$O$_8$: characterization as anode material for an aqueous rechargeable Li-ion battery system," *Electrochimica Acta* 46: 59-65, 2000.
Li et al., "Rechargeable Lithium Batteries with Aqueous Electrolytes," *Science* 264:1115-1118, 1994.
Liu et al., "Effects of fluorine doping on the electrochemical properties of LiV$_3$O$_8$ cathode material," *Electrochimica Acta* 54:3184-3190, 2009.
Liu et al., "Facile synthesis of NaV$_6$O$_{15}$ nanorods and its electrochemical behavior as cathode material in rechargeable lithium batteries," *J. Mater. Chem.* 19:7885-7891, 2009.
Liu et al., "Study on the synthesis and properties of LiV$_3$O$_8$ rechargeable lithium batteries cathode," *Electrochimica Acta* 47:3239-3243, 2002.
Liu et al., "Synthesis and electrochemical properties of single-crystalline LiV$_3$O$_8$ nanorods as cathode materials for rechargeable lithium batteries," *Journal of Power Sources* 192:668-673, 2009.
Luo et al., "Raising the cycling stability of aqueous lithium-ion batteries by eliminating oxygen in the electrolyte," *Nature Chemistry* 2:760-765, 2010.
O'Brien et al., "Advancing electric-vehicle development with pure-lead-tin battery technology," *Journal of Power Sources* 67:151-155, 1997.
Peng et al., "A Reversible and Higher-Rate Li—O$_2$ Battery," *Science* 337:563-566, 2012.
Pitchai et al., "Nanostructured cathode materials: a key for better performance in Li-ion batteries," *J. Mater. Chem.* 21:11040-11051, 2011.
Ragupathy et al., "Preparation of Nanostrip V$_2$O$_5$ by the Polyol Method and Its Electrochemical Characterization as Cathode Material for Rechargeable Lithium Batteries," *J. Phys. Chem. C* 112:16700-16707, 2008.
Rietveld, "A Profile Refinement Method for Nuclear and Magnetic Structures," *J. Appl. Cryst.* 2:65-71, 1969.
Rietveld, "Line profiles of neutron powder-diffraction peaks for structure refinement," *Acta Cryst.* 22:151-152, 1967.
Slater et al., "Sodium-Ion Batteries," *Adv. Funct. Mater.* 23:947-958, 2013.
Soloveichik, "Battery Technologies for Large-Scale Stationary Energy Storage," *Annu. Rev. Chem. Biomol. Eng.* 2:503-527, 2011.
Spahr et al., "Electrochemistry of Chemically Lithiated NaV$_3$O$_8$: A Positive Electrode Material for Use in Rechargeable Lithium-Ion Batteries," *J. Electrochem. Soc.* 145(2):421-427, Feb. 1998.
Wadsley, "Crystal Chemistry of Non-stoichiometric Pentavalent Vanadium Oxides: Crystal Structure of Li$_{1+x}$V$_3$O$_8$," *Acta Cryst.* 10:261-267, 1957.
Wang et al., "A new cathode material Na$_2$V$_6$O$_{16}$·$_x$H$_2$O nanowire for lithium ion battery," *Journal of Power Sources* 199:263-269, 2012.
Wang et al., "An Aqueous Rechargeable Lithium Battery with Good Cycling Performance," *Angew. Chem. Int. Ed.* 46:295-297, 2007.
Wang et al., "Electrochemical properties of TiP$_2$O$_7$ and LiTi$_2$(PO$_4$)$_3$ as anode material for lithium ion battery with aqueous solution electrolyte," *Electrochimica Acta* 52:3280-3285, 2007.
Wang et al., "Electrochemical property of NH$_4$V$_3$O$_8$·0.2H$_2$O flakes prepared by surfactant assisted hydrothermal method," *Journal of Power Sources* 196:788-792, 2011.
Wessells et al., "Copper hexacyanoferrate battery electrodes with long cycle life and high power," *Nature Communications* 2:550-554, Nov. 22, 2011.

(56) References Cited

OTHER PUBLICATIONS

Whitacre et al., "$Na_4Mn_9O_{18}$ as a positive electrode material for an aqueous electrolyte sodium-ion energy storage device," *Electrochemistry Communications* 12:463-466, 2010.

Whittingham, "Lithium Batteries and Cathode Materials," *Chem. Rev.* 104:4271-4301, 2004.

Winter et al., "What Are Batteries, Fuel Cells, and Supercapacitors?," *Chem. Rev.* 104:4245-4269, 2004.

Yabuuchi et al., "P2-type $Na_x[Fe_{frac;1;2}Mn_{frac;1;2}]O_2$ made from earth-abundant elements for rechargeable Na batteries," *Nature Materials* 11:512-517, 2012.

Yang et al., "Electrochemical Energy Storage for Green Grid," *Chem. Rev.* 111:3577-3613, 2011.

Yu et al., "A Simple and General Method for the Synthesis of Multicomponent $Na_2V_6O_{16} \cdot 3H_2O$ Single-Crystal Nanobelts," *J. Am. Chem. Soc.* 126:3422-3423, 2004.

Zhou et al., "Selected-Control Synthesis of $NaV_6O_{15}$ and $Na_2V_6O_{16} \cdot 3H_2O$ Single-Crystalline Nanowires," *Crystal Growth and Design* 5(3):969-974, 2005.

\* cited by examiner (A)

(B)

(A)

(B)

(D)

As Anode

(E)

Full range

(A)

(B)

(C)

(A)

$Li_3V_6O_{16}$ as Anode at 1C in 3M $LiNO_3$ (B)

$Li_3V_6O_{16}$ as Cathode at 1C in 3M $LiNO_3$ (C)

(D)

(E)

As Anode

(F)

Full range

METHOD OF PREPARING A VANADIUM OXIDE COMPOUND AND USE THEREOF IN ELECTROCHEMICAL CELLS

CROSS-REFERENCE TO RELATED APPLICATION

This application claims the benefit of priority of U.S. provisional application No. 61/760,347 filed on 4 Feb. 2013, the content of which is incorporated herein by reference in its entirety for all purposes.

TECHNICAL FIELD

The invention relates to a method of preparing a vanadium oxide compound and use of the vanadium oxide compound in electrochemical cells.

BACKGROUND

Global concerns over depleting supplies of fossil fuel and global warming have resulted in extensive research in area of renewable energy. Energy storage plays a vital role in conversion of energy obtained from renewable resources to energy grid.

One such energy storage system is rechargeable batteries, which play a vital role in daily utilities like computers, mobile phones, and electric vehicles (EVs). Existing rechargeable battery systems include lead-acid, nickel-cadmium, nickel-metal hydride (Ni-MH), and lithium-ion batteries (LIBs). Most of these systems have intrinsic problems. For example, lead acid and nickel cadmium systems suffer from low energy density, and environmental concerns stemming from use of toxic materials such as lead and cadmium, while Ni-MH batteries have issues with large self-discharge.

LIBs face high safety risks due to flammability of organic electrolyte and reactivity of the electrode material with the organic electrolyte during overcharging or short-circuiting. Consequently, manufacturing of LIBs requires sophisticated cell assembly technologies involving a dry and air-tight environment to prevent premature oxidation/hydroxylation of lithium ions. Such demanding processing conditions lead to high product costs of LIBs. Moreover, large-scale energy storage technologies translate into considerable concern regarding safety and toxicity, alongside electrochemical issues related to loss of energy density and efficiency. Most of the major fires and accidents in automobile and aircraft engines are related to lithium ion batteries.

In view of the above, there is a need for development of low-cost, safe, high-power alternatives to conventional LIBs for use in large scale applications such as electric vehicles.

A possibility for energy storage in the form of aqueous rechargeable lithium ion battery (ARLB) has been developed. This is a safer alternative and may be competent enough to match performance of current LIBs. One major advantage of ARLB systems relate to use of water as the electrolyte medium. For example, a leakage in an ARLB package is unlikely to result in fire and/or to reduce performance of the battery. This renders ARLB technology useful for many applications such as electric vehicles, large scale grid based energy storage, and in portable and wearable electronics.

Notwithstanding the above, presence of complicated reactions in a typical ARLB means that selection of electrode materials in ARLB remains challenging. For example, electrode materials that do not release oxygen or hydrogen during battery charge-discharge process are needed to allow use of ARLB in practical applications. This specific requirement translates into limitations in terms of the overall voltage and therefore, energy density of the battery. Therefore, design of new electrode materials for ARLBs with enhanced performance is of great importance.

In view of the above, there remains a need for an improved material for use in electrochemical cells, in particular aqueous rechargeable batteries, that overcomes or at least alleviates one or more of the above-mentioned problems.

SUMMARY

In a first aspect, the invention relates to an electrochemical cell comprising an anode and a cathode. The anode and the cathode independently comprises or consists essentially of a vanadium oxide compound of general formula (I)

$$M_nV_6O_{16} \qquad (I),$$

wherein M is selected from the group consisting of ammonium, alkali-metal, and alkaline-earth metal; and n is 1 or 2.

In a second aspect, the invention relates to a method of preparing a vanadium oxide compound of general formula (I)

$$M_nV_6O_{16} \qquad (I),$$

wherein M is selected from the group consisting of ammonium, alkali-metal, and alkaline-earth metal; and n is 1 or 2; the method comprising heating a mixture comprising vanadium oxide and an alkaline solution of M under hydrothermal conditions to form the vanadium oxide compound.

In a third aspect, the invention relates to an electrode prepared by a method according to the second aspect.

BRIEF DESCRIPTION OF THE DRAWINGS

The invention will be better understood with reference to the detailed description when considered in conjunction with the non-limiting examples and the accompanying drawings, in which:

—FIG. 3A and FIG. 3B: 2 μm; FIG. 3C: 1 μm; FIG. 3D: 50 nm; FIG. 3E: 100 nm; and FIG. 3F: 200 nm.

DETAILED DESCRIPTION

Figure 1:
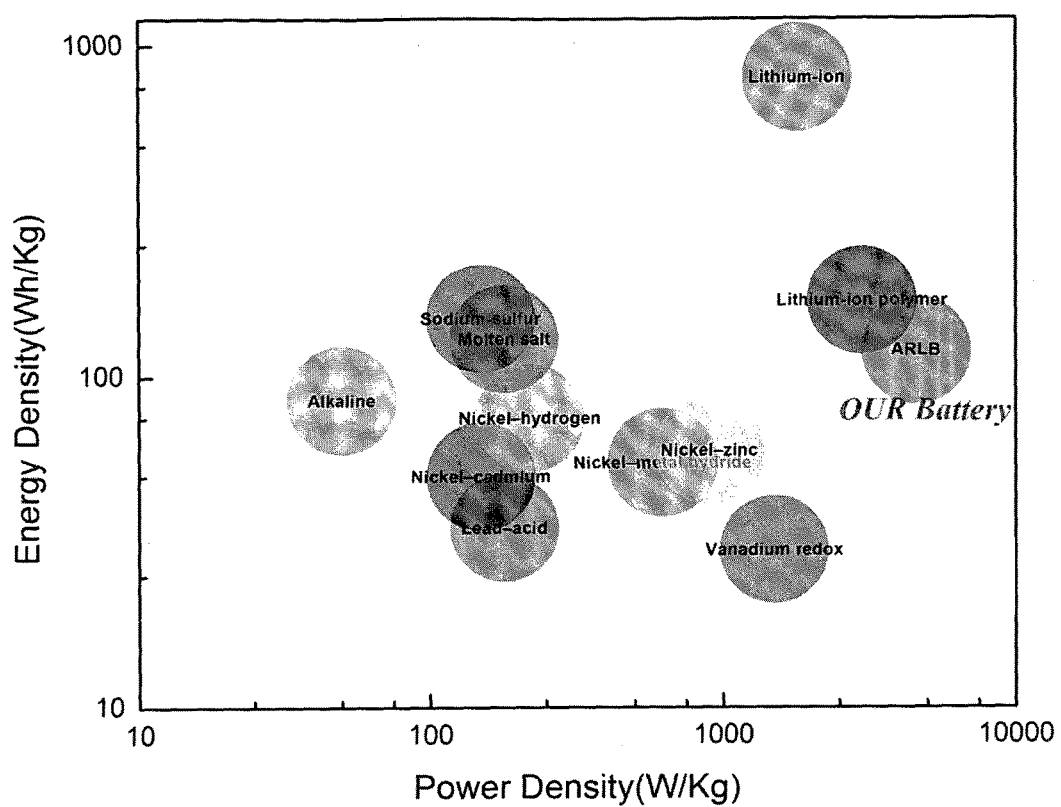
FIG. 1 is an energy density vs power density Ragone comparison plot. Energy density (Wh/kg) is plotted against power density (W/kg) for various state of the art electrochemical cells, as well as for an electrochemical cell disclosed herein and which is denoted as "OUR Battery" in the graph.

Nanostructured vanadium oxide compounds, such as single crystalline nanobelts of vanadium oxide compounds, are prepared by a method disclosed herein. Advantageously, the method of preparation is simple and cost-effective, which renders it suitable and easily adaptable for industrial application. The nanostructured vanadium oxide compounds may be used to manufacture cathodes and anodes for use in aqueous rechargeable batteries such as ARLBs. As the same vanadium oxide compound may be used in both anode and cathode, this reduces processing variables, resulting in improved processing efficiency and cost savings. Values of capacity, rate, and cycling stability obtained using an electrochemical cell disclosed herein are highest amongst aqueous rechargeable batteries reported to-date. Non-toxic nature of the compounds and reagents used, such as aqueous reagents as electrolyte (as compared to conventional organic solvents which tend to be toxic), also means that the electrochemical cell is environmentally friendly and safe for the user.

In a first aspect the present invention refers to an electrochemical cell. The term "electrochemical cell" or "cell" refers to a device that converts chemical energy into electrical energy, or electrical energy into chemical energy. Generally, electrochemical cells have two or more electrodes and an electrolyte, wherein electrode reactions occurring at the electrode surfaces result in charge transfer processes. Examples of electrochemical cells include, but are not limited to, batteries and electrolysis systems.

The electrochemical cell comprises an anode and a cathode, wherein the anode and the cathode independently comprises or consists essentially of a vanadium oxide compound.

The terms "anode" and "negative electrode" are used interchangeably, and refer to the electrode having the lower of electrode potential in an electrochemical cell (i.e. lower than the positive electrode). Conversely, the terms "cathode" and "positive electrode" are used interchangeably, and refer to the electrode having the higher of electrode potential in an electrochemical cell (i.e. higher than the negative electrode). The term "electrode potential" refers to a voltage, usually measured against a reference electrode, due to the presence within or in contact with the electrode of chemical species at different oxidation (valence) states.

Vanadium oxide compounds disclosed herein may alternatively be referred to as vanadium oxide bronzes compounds, in which the term "bronzes" is used to refer to the respective vanadium oxides which exhibit unique physical (electrical, optical, mechanical etc.) and chemical (high resistance to acids) properties similar to tungsten bronzes.

Advantageously, vanadium oxides are abundant in nature thereby resulting in their low costs. Coupled with their remarkable structural flexibility and high discharge capacity, vanadium oxides and their derivatives are rendered attractive for various industrial applications such as large scale grid energy storage.

The vanadium oxide compound has general formula (I)

$$M_nV_6O_{16} \quad\quad\quad (I)$$

wherein M is selected from the group consisting of ammonium, alkali-metal, and alkaline-earth metal; and n is 1 or 2.

An alkali-metal and an alkaline-earth metal refer respectively to an element that is listed in Groups 1 and 2 of the Periodic Table of the Elements. Examples of alkali-metal include lithium (Li), sodium (Na), potassium (K), rubidium (Rb), cesium (Cs), and francium (Fr). Examples of alkaline-earth metal include beryllium (Be), magnesium (Mg), calcium (Ca), strontium (Sr), barium (Ba), and radium (Ra).

In various embodiments, M is selected from the group consisting of ammonium, sodium, potassium, lithium, calcium and magnesium. In specific embodiments, M is selected from the group consisting of ammonium, sodium, potassium, and magnesium.

By the term "independently", it is meant that the vanadium oxide compound in the anode and that in the cathode of the electrochemical cell disclosed herein is independently selected. The vanadium oxide compound in the anode and in the cathode of the electrochemical cell may be the same or different.

In some embodiments, the vanadium oxide compound that is used to form the anode and the cathode of the electrochemical cell disclosed herein are the same. Accordingly, the anode and the cathode in the electrochemical cell may be termed as symmetric electrodes, whereby the term "symmetric electrodes" refers two electrodes having the same composition, i.e. they are made froth the same materials. Such electrochemical cells may also be termed as symmetrical electrochemical cells. In various embodiments, the electrochemical cell is a symmetrical electrochemical cell.

The vanadium oxide compound may be a microstructured or a nanostructured vanadium oxide compound. As used herein, the terms "microstructured" and "nanostructured" refer respectively to the vanadium oxide compound having at least one dimension in the micrometer or the nanometer range. The vanadium oxide compound may comprise or consist of nanobelts, microrods, nanorods, nanofibers, or combinations thereof.

In various embodiments, the vanadium oxide compound is a microstructured vanadium oxide compound. For example, the vanadium oxide compound may comprise or consist of microrods. The at least one dimension of the microstructured vanadium oxide compound may be less than 100 μm, such as a length in the range from about 1 μm to about 100 μm, about 1 μm to about 80 μm, about 1 nm to about 60 μm, about 1 μm to about 40 μm, about 10 μm to about 100 μm, about 10 μm to about 80 μm, about 10 μm to about 60 μm, about 10 μm to about 40 μm, about 20 μm to about 80 μm, or about 30 μm to about 60 μm.

In various embodiments, the vanadium oxide compound is a nanostructured vanadium oxide compound. The at least one dimension of the nanostructured vanadium oxide compound may be less than 100 nm, such as a length in the range from about 1 nm to about 100 nm, about 1 nm to about 80 nm, about 1 nm to about 60 nm, about 1 nm to about 40 nm, about 10 nm to about 100 nm, about 10 nm to about 80 nm, about 10 nm to about 60 nm, about 10 nm to about 40 nm, about 20 nm to about 80 nm, or about 30 nm to about 60 nm.

The nanostructured vanadium oxide compound may assume any form, such as nanoparticles, nanopowder, nanorods, nanowires, nanotubes, nanobelts, nanodiscs, nanoflowers, nanoflakes and nanofilms. In various embodiments, the nanostructured vanadium oxide compound comprises or consists of nanobelts, nanorods, or nanofibers. The term "nanobelt" as used herein refers to a one-dimensional nanostructure having a long and flat structure, and which bears resemblance to a belt, strip or ribbon. Typically, nanobelts are chemically pure, structurally uniform single crystals, possessing rectangular cross-sections, clean edges and smooth surfaces.

Size of the nanobelts may be characterized by their diameter and/or their length. The term "diameter" as used herein refers to the maximal length of a straight line segment, when applied to a cross-section of the figure, that passes through the center of the figure and terminating at the periphery. Average diameter of the nanobelts may be calculated by dividing the sum of the diameter of each nanobelt by the total number of nanobelts.

In various embodiments, the nanobelts have an average diameter in the range of about 50 nm to about 100 nm, such as about 50 nm to about 80 nm, about 50 nm to about 70 nm, about 50 nm to about 60 nm, about 60 nm to about 100 nm, about 70 nm to about 100 nm, about 80 nm to about 100 nm, about 90 nm to about 100 nm, about 55 nrn, about 65 nm, about 75 nm, about 85 nm or about 95 nm.

The nanobelts may have an average length of about 2 μm. Advantageously, the nanobelts disclosed herein have high aspect ratios, wherein the term "aspect ratio" is defined as ratio of length to diameter of a nanobelt.

A plurality of the nanobelts may join or attach together in the centre portion along their lengths to form a nanobelt bundle. In various embodiments, the nanostructured vanadium oxide compound comprises or consists of nanobelt bundles.

In various embodiments, the nanostructured vanadium oxide compound comprises or consists of nanorods. The nanorods may have an average length in the range of about 1 μm to about 10 μm. For example, the nanobelts may have an average length in the range of about 1 μm to about 8 μm, such as about 1 μm to about 6 μm, about 1 μm to about 4 μm, about 3 μm to about 10 μm, about 5 μm to about 10 μm, about 7 μm to about 10 μm, about 3 μm to about 8 μm, about 4 μm to about 6 μm, about 4 μm, about 5 μm, or about 6 μm. In specific embodiments, average length of the nanobelts is about 5 μm.

In various embodiments, the anode and the cathode independently further comprise a binder. As used herein, the term "binder" refers to a substance that is capable of holding or attaching two or more materials together. Either one of or both the anode and the cathode may contain the binder. The binder that is comprised in the anode and the cathode may be the same or different. In various embodiments, the same binder is used in the anode and the cathode. Examples of a binder that may be used include, but are not limited to, polyvinylidene fluoride (PVDF), styrene-butadiene rubber (SBR), polyacrylic acid (PAA), carboxymethyl cellulose (CMC), polyacrylonitrile, polymethylmethacrylate (PMMA), polytetrafluoroethylene (PTFE), mixtures thereof, and copolymers thereof.

In various embodiments, the binder comprises or consists of polyvinylidene fluoride (PVDF). Advantageously, PVDF provides good binding properties as well as good electrochemical stability.

The anode and the cathode may independently further comprise an electrically conductive agent. Generally, the electrically conductive agent may be used to maximize flow rate, increase extraction efficiency, and decrease electrode regeneration time of the electrochemical cell by facilitating the formation of thinner electrodes. Either one of or both the anode and the cathode may contain the electrically conductive agent. The electrically conductive agent that is comprised in the anode and the cathode may be the same or different. In various embodiments, the same electrically conductive agent is used in the anode and the cathode.

In various embodiments, the electrically conductive agent is selected from the group consisting of graphite, conductive carbon black, conductive carbon fibers, metal fibers, metal particles, particles of intrinsically conductive polymers, and combinations thereof. In specific embodiments, the electrically conductive agent comprises or consists of conductive carbon black.

The vanadium oxide compound, binder and/or the electrically conductive agent may be dispersed in a solvent to form a slurry. Examples of solvent may be used include 1-methyl-2-pyrrolidinone, acetone, water, and the like. In various embodiments, the solvent comprises or consists of 1-methyl-2-pyrrolidinone. In various embodiments, the weight ratio of vanadium oxide compound to binder to electrically conductive agent is about 75:15:10.

As mentioned above, the anode and the cathode of the electrochemical cell may have the same composition. This reduces processing variables, resulting in improved processing efficiency and cost savings.

The electrochemical cell may further comprise an aqueous electrolyte. The aqueous electrolyte may contain salts of M, wherein M is selected from the group consisting of ammonium, alkali-metal, and alkaline-earth metal. Examples of M have already been described above. Examples of salts of M include, but are not limited to, the respective sulfate salts, nitrate salts, phosphate salts, halide salts, and acetate salts of M. The term "halide" includes fluoride, chloride, bromide, and iodide.

In various embodiments, the aqueous electrolyte contains salts of sodium, potassium, ammonium, magnesium, or combinations thereof. In specific embodiments, the aqueous electrolyte comprises or consists essentially of lithium sulfate or lithium chloride. In embodiments where aqueous electrolytes are used, the electrochemical cells may also be termed aqueous rechargeable batteries. The vanadium oxide compounds disclosed herein are suitable for use in aqueous rechargeable batteries, such as aqueous rechargeable lithium ion batteries.

In a second aspect, the invention relates to a method of preparing a vanadium oxide compound of general formula (I)

$$M_nV_6O_{16} \qquad (I),$$

wherein M is selected from the group consisting of ammonium, alkali-metal, and alkaline-earth metal; and n is 1 or 2.

As mentioned above, M may be selected from the group consisting of ammonium, sodium, potassium, lithium, calcium and magnesium. In various embodiments, M is selected from the group consisting of ammonium, sodium, potassium, and magnesium.

The vanadium oxide compound may be a microstructured or a nanostructured vanadium oxide compound. For example, the vanadium oxide compound may comprise or consist of nanobelts, microrods, nanorods, nanofibers, or combinations thereof.

In various embodiments, the vanadium oxide compound is a nanostructured vanadium oxide compound, such as a nanobelt or a nanorod. The nanobelts may have an average diameter in the range of about 50 nm to about 100 nm, and an average length of about 2 μm. The nanorods may have an average length in the range of about 1 μm to about 10 μm.

The method of the second aspect includes heating a mixture comprising vanadium oxide and an alkaline solution of M under hydrothermal conditions to form the vanadium oxide compound.

The term "hydrothermal" as used herein refers to treatment conditions of a reagent in a sealed system such as a closed vessel or an autoclave, whereby temperatures in the system are raised to a temperature above normal boiling point of the reagent at a pressure that is equal to or greater than the pressure required to prevent boiling of the reagent.

The alkaline solution may be a hydroxide or an acetate of M. In various embodiments, the alkaline solution is sodium hydroxide, lithium acetate, potassium hydroxide, or calcium hydroxide.

Depending on the reagent present in the sealed system, different temperatures may be used. In various embodiments, heating a mixture comprising vanadium oxide and an alkaline solution of M under hydrothermal conditions comprises heating the mixture in an autoclave at a temperature in the range of about 120° C. to about 300° C.

For example, heating the mixture may be carried out in the range of about 120° C. to about 250° C., about 120° C. to about 200° C., about 120° C. to about 150° C., about 150° C. to about 300° C., about 200° C. to about 300° C., about 250° C. to about 300° C., about 180° C. to about 250° C., about 180° C. to about 200° C., about 180° C., about 190° C., or about 200° C. In specific embodiments, heating a mixture comprising vanadium oxide and an alkaline solution of M under hydrothermal conditions comprises heating the mixture in an autoclave at a temperature in the range of about 180° C. to about 200° C.

The method of the second aspect may include drying the vanadium oxide compound at a temperature in the range of about 25° C. to about 120° C. For example, the vanadium oxide compound may be dried by placing it in an oven that is set to a temperature that is in the range of about 25° C. to about 120° C., such as about 25° C. to about 100° C., about 25° C. to about 80° C., about 25° C. to about 60° C., about 25° C. to about 40° C., about 40° C. to about 120° C., about 60° C. to about 120° C., about 80° C. to about 120° C., about 100° C. to about 120° C., about 60° C. to about 100° C., about 80° C. to about 100° C., or about 75° C. to about 110° C.

In various embodiments, the method of the second aspect includes calcining the vanadium oxide compound at a temperature in the range of about 200° C. to about 400° C. For example, calcining the vanadium oxide compound may be carried out at a temperature in the range of about 200° C. to about 350° C., about 200° C. to about 300° C., about 200° C. to about 250° C., about 250° C. to about 400° C., about 300° C. to about 400° C., about 350° C. to about 400° C., about 250° C. to about 350° C., about 220° C. to about 320° C., or about 280° C. to about 480° C.

In specific embodiments, calcination of the vanadium oxide compound is carried out at about 400° C. Advantageously, it has been surprisingly found by the inventors that vanadium oxide compounds that are heat treated at 400° C. results in formation of larger and thicker crystalline structures compared to those obtained by heat treatment at temperatures lower than 400° C. This higher crystallinity, or larger crystal size, results in improved cyclic stability hence superior electrochemical performance of the vanadium oxide compounds formed.

In a third aspect, the invention refers to an electrode prepared by a method according to the second aspect.

As mentioned above, the electrode may be used as an anode and/or a cathode in an electrochemical cell, such as in aqueous rechargeable batteries. In various embodiments, depending on the type of salt used in the electrolyte, the electrochemical cell is selected from the group consisting of an aqueous rechargeable lithium ion battery, an aqueous rechargeable lithium ion battery, an aqueous rechargeable sodium ion battery, an aqueous rechargeable potassium ion battery, an aqueous rechargeable magnesium ion battery, an aqueous rechargeable calcium ion battery, and an aqueous rechargeable ammonium ion battery. These batteries may, in turn be used for electric vehicles and wearable electronics, for example, as the electrolyte used in these batteries are aqueous-based and safe for operation, as compared to conventional lithium ion and bulkier lead acid batteries.

Hereinafter, the present invention will be described more fully with reference to the accompanying drawings, in which exemplary embodiments of the invention are shown. This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art. In the drawings, lengths and sizes of layers and regions may be exaggerated for clarity. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The invention illustratively described herein may suitably be practiced in the absence of any element or elements, limitation or limitations, not specifically disclosed herein. Thus, for example, the terms "comprising", "including", "containing", etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the inventions embodied therein herein disclosed may be resorted to by those skilled in the art, and that such modifications and variations are considered to be within the scope of this invention.

The invention has been described broadly and generically herein. Each of the narrower species and subgeneric groupings falling within the generic disclosure also form part of the invention. This includes the generic description of the invention with a proviso or negative limitation removing any subject matter from the genus, regardless of whether or not the excised material is specifically recited herein.

Other embodiments are within the following claims and non-limiting examples. In addition, where features or aspects of the invention are described in terms of Markush groups, those skilled in the art will recognize that the invention is also thereby described in terms of any individual member or subgroup of members of the Markush group.

EXPERIMENTAL SECTION

Example 1

Synthesis and Characterization of $Na_2V_6O_{16}$ (NVO)

Analytically pure vanadium pentoxide ($V_2O_5$, 98%, Sigma Aldrich) and sodium hydroxide (NaOH, Sigma Aldrich) were used as such.

20 ml, 0.01 moles of NaOH was mixed with 20 ml, 0.01 moles of $V_2O_5$ in deionized (DI) water, and stirred overnight to obtain an orange brown solution.

The 40 ml solution was transferred to a 50 ml Teflon-lined stainless steel autoclave and sealed before heating at 180° C. for 48 hr, and allowed to cool naturally to room temperature. The resulting mixture was filtered to obtain the precipitate, which was washed thoroughly with DI water. Subsequently, the precipitate was dried at 80° C. for 4 hr to obtain the as-synthesized $Na_2V_6O_{16}$ powder (NVO).

To study the effect of heat-treatment on the properties of NVO and optimize the annealing temperature to obtain the best performing material, further heat treatment was carried out for 2 hr at 200° C., 300° C., and 400° C., which are denoted as NVO-200, NVO-300 and NVO-400 respectively.

In an experiment carried out using the above-mentioned procedure, 0.4 g of NaOH in 20 ml of water and 1.82 g $V_2O_5$ in 20 ml water were prepared/dissolved separately, before mixing together. The resultant mixture was heated under stirring overnight at 80° C. (Day 1). Subsequently, the solution was transferred to an autoclave, where it is placed at 180° C. for 48 hours (Days 2 and 3).

Afterwards, the mixture was centrifuged and washed three times using DI water. A pH check using pH paper was carried out, to check that it is neutral. The mixture was dried by placing it overnight in a vacuum oven (Day 4). The dried solids or the 'chunk' was milled and sintered at different temperatures, such as 400° C. in air for 2 hours (Day 5).

Example 2

Synthesis and characterization of $Li_2V_6O_{16}$ (LVO)

In a typical experiment, a mixture of lithium acetate ($CH_3COOLi.2H_2O$) and vanadium pentoxide ($V_2O_5$) was dissolved in 25 ml deionized (DI) water in 1:1.2 molar ratio.

The resulting solution was mixed thoroughly by stirring until it turns red. pH of the solution was 9.0. The solution was neutralized and allowed to undergo hydrothermal process in Teflon-lined stainless steel autoclave for 48 hr at 200° C. The product was collected by centrifugation, followed by repeated washings in DI water and ethanol to remove any possible ionic remnants, and dried in vacuum overnight at 105° C. The sample was then calcinated at 400° C., and ground to obtain the highly crystalline LVO.

Example 3

Synthesis and Characterization of $K_2V_6O_{16}$ (KVO)

Analytically pure vanadium pentoxide ($V_2O_5$, 98%, Sigma Aldrich) and potassium hydroxide (KOH, Sigma Aldrich) were used as such. 40 ml, 0.012 moles of KOH was mixed with 40 ml, 0.014 moles of $V_2O_5$ in DI water, and stirred overnight to obtain an orange brown solution.

The 80 ml solution was then transferred to a 100 ml Teflon-lined stainless steel autoclave, and sealed before heating at 180° C. for 48 hr. Following this, the solution was allowed to cool naturally to room temperature. The resulting mixture was filtered to obtain the precipitate, which was washed thoroughly with DI water. Subsequently, the precipitate was dried at 110° C. for 16 hr to obtain the as-synthesized $K_2V_6O_{16}$ powder (KVO).

Example 4

Synthesis and Characterization of $CaV_6O_{16}$ (CVO)

Analytically pure vanadium pentoxide ($V_2O_5$, 98%, Sigma Aldrich) and calcium hydroxide ($Ca(OH)_2$, Sigma Aldrich) were used as such. 20 ml, 0.005 moles of $Ca(OH)_2$ was mixed with 20 ml, 0.0112 moles of $V_2O_5$ in DI water, and stirred overnight to obtain an orange brown solution. pH of the solution was 9.0.

pH of the solution was then lowered to pH 2.5. The 40 ml solution was then transferred to a 50 ml Teflon-lined stainless steel autoclave, and sealed before heating at 200° C. for 36 hours and allowed to cool to room temperature naturally. The resulting mixture was filtered to obtain the precipitate, which was washed thoroughly with DI water. No further heat treatment was carried out to obtain CVO.

Example 5

Characterisation Studies

The morphologies and structure of the nanobelts prepared are studied via field-emission scanning electron microscopy (FESEM) and transmission electron microscopy (TEM), and X-ray diffraction (XRD) techniques.

Morphological studies were conducted using field-emission scanning electron microscopy (FE-SEM, JEOL, JSM-6340F) at an accelerating voltage of 5 kV and transmission electron microscopy (TEM, JEOL 2100F) in high resolution mode operating at an accelerating voltage of 200 kV.

Phase purity and crystal structure of the NVOs were examined by a Bruker X-ray diffractometer D8 Powder (Cu-K$\alpha$ radiation, with step scanning (0.01°, 0.6 s dwell time, 40 kV)). The obtained X-ray diffraction (XRD) patterns were analyzed by Rietveld refinement within the Topas V3 (Bruker-AXS), using the fundamental parameters approach.

Example 6

Electrochemical Measurements

Electrochemical behaviors of nanobelts prepared were studied via cyclic voltammetry (CV) and galvanostatic studies.

Electrochemical cells were prepared by mixing the active material, binder (Kynar 2801), and Super P Li carbon (Timcal) using weight ratio of 75:15:10, with 1-methyl-2-pyrrolidinone (NMP, anhydrous) as solvent to form a slurry. The well-mixed, viscous slurry was coated onto a 1 cm² area of graphite paper and dried in a convection oven at 80° C. to form the electrodes.

To elucidate the electrochemical processes of the aqueous LIB, cyclic voltammetry (CV) was carried out in a three-electrode configuration, using 4 M lithium chloride (LiCl) aqueous solution, with platinum foil and a standard calomel electrode (SCE) as the counter and reference electrodes, and galvanostatic charge/discharge was performed in both three-electrode configuration in 4 M lithium chloride (LiCl) aqueous solution, with platinum foil and standard calomel electrode (SCE) as reference and counter electrode respectively, using a computer-controlled potentiostat (Solartron, 1470E) at room temperature, in the voltage range of −1.0 to 1.0 V vs. SCE.

Charge/discharge and cycling studies of ARLB were conducted in a full cell configuration having $Na_2V_6O_{16}$ as both cathode and anode electrode in 4 M lithium chloride (LiCl) aqueous solution and standard calomel electrode (SCE) as reference electrode, using a computer-controlled potentiostat (Solartron, 1470E) at room temperature, in the voltage range of −0.4 to 1.28 V vs. SCE.

Example 7

Results and Discussion

Figure 3:
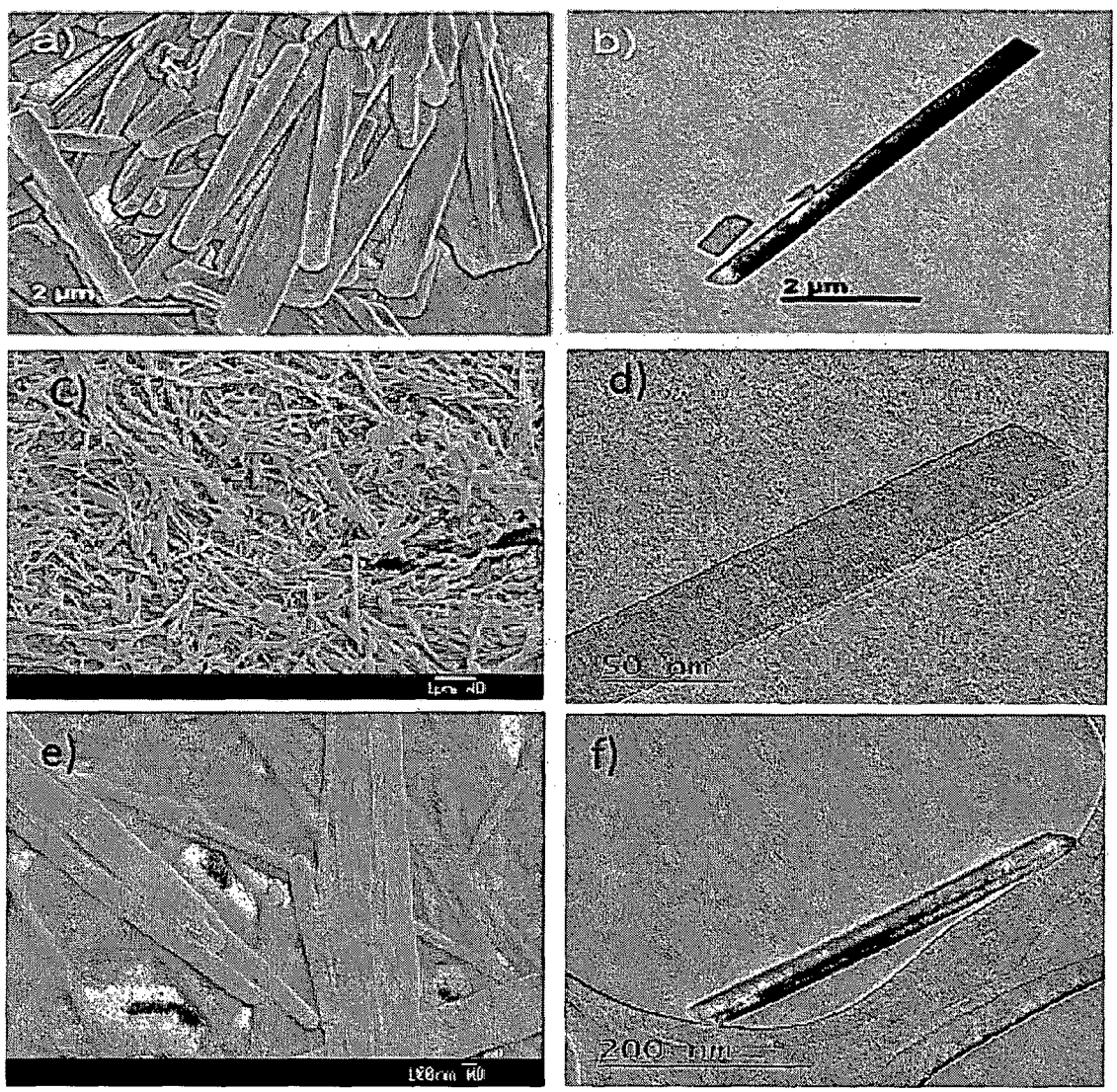
FIG. 3A to 3F show field emission scanning electron microscopy (FE-SEM) images and transmission electron microscopy (TEM) images of $Li_2V_6O_{16}$ (LVO), $Na_2V_6O_{16}$ (NVO), and $CaV_6O_{16}$ (CVO) disclosed herein, where (A): FE-SEM image of LVO; (B): TEM image of LVO; (C): FE-SEM image of NVO; (D): TEM image of NVO; (E): FE-SEM image of CVO; and (F): TEM image of CVO. Scale bar in the figures denote the following lengths

FE-SEM was carried out to observe morphologies of NVO, LVO and KVO as shown in FIG. 3. The FESEM (FIG. 3C) of NVO shows well-bundled nanobelt morphology with aspect ratio of about 20 (average diameter of about 100 nm and length less than or equal to 2 μm). On the other hand, NVO possess rod-like morphology, which may indicate better crystallinity than LVO, with particle size in submicron range of 80 nm to 100 nm (FIG. 3A). Finally KVO exhibits high aspect ratio (greater than 50) nanowires with average diameter of about 50 nm to about 100 nm (FIG. 3E).

Further, observations of LVO under bright-field TEM (FIG. 3B) shows presence of several layers of lamellar crystals, giving rise to the rod-like morphology. In general, the crystals of NVO sintered at 400° C., (NVO-400, FIG. 3D) show the formation of larger and thicker crystals with belt-like morphology, while KVO shows a wire-like morphology (FIG. 3F).

The powder XRD patterns of MVOs (FIG. 4) are collected to elucidate the crystal structures, and evaluated using the Rietveld refinement method. The XRD patterns (FIG. 4A) may be fully indexed to the crystal structure of $Na_2V_6O_{16}$ (JCPDS 16-0601) via Rietveld refinement, without presence of any impurity peaks. The lattice parameters calculated by the Topas software for NVO are a=7.10(2) Å, b=3.45(5) Å, and c=11.84(2) Å, with average crystal size about 7 nm.

Figure 2:
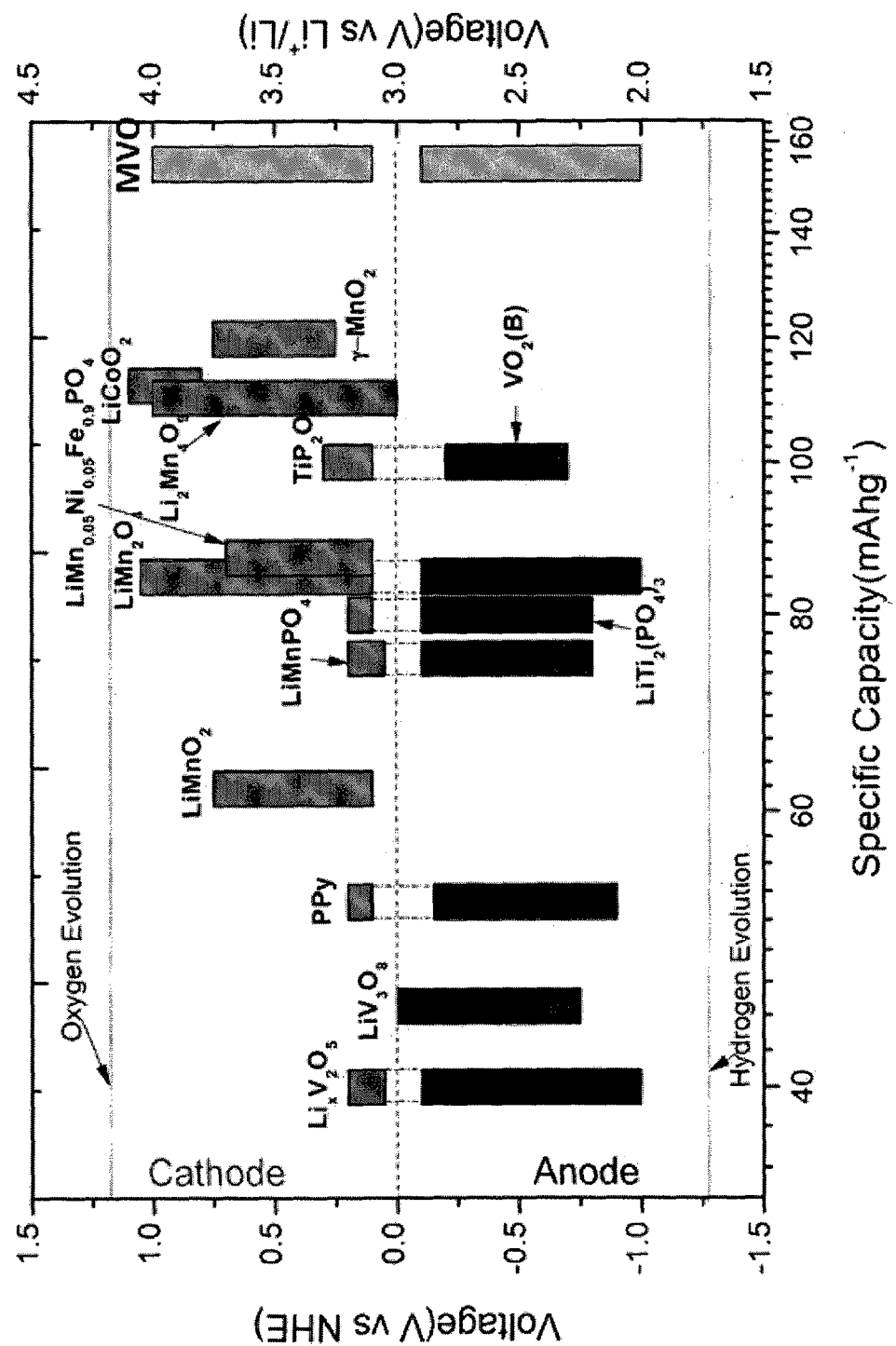
FIG. 2 is a graph showing voltage (V vs NHE) vs specific capacity (mAhg$^{-1}$) for cathode and anode materials that are presently used or under serious consideration for next generation of aqueous rechargeable lithium-ion batteries. The term "MVO" denoted in the figure refers to $M_nV_6O_{16}$ disclosed herein.

It is probable that, higher heating temperature may enable better formation of the super-cell structure, resulting in $Na_2V_6O_{16}$. Also, as the lattice parameters have similar values to those reported in literature, formation of $Na_2V_6O_{16}$ can thus be confirmed. The increase in crystal size is very much in agreement with observations under TEM. The powder XRD patterns (FIG. 4B) were collected to elucidate crystal structure of LVO and evaluated using the Rietveld refinement method. The XRD patterns (FIG. 2A) can be fully indexed to the crystal structure of $Li_3V_6O_{16}$ (P12$_1$/ml, PDF 4-0417) via Rietveld refinement (R factor less than 0.06), without the presence of any impurity peaks. The lattice parameters calculated by the Topas software for LVO were a=12.03(2) A, b=3.60(1) A and c=6.68 (2) A, with average crystal volume of about 275.45 Å³. Based on previously reported data, formation of single phase of crystalline $Li_3V_6O_16$ wires may be ascertained. Similarly, XRD patterns for KVO (FIG. 4C) and CVO (FIG. 4D) indicate their formation.

Figure 5:
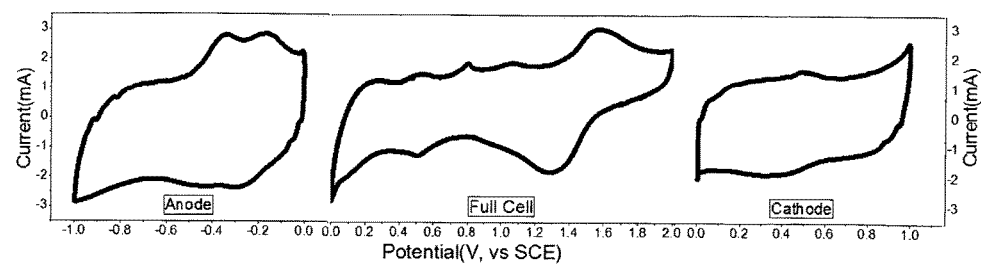
FIG. 5A to 5E are (A) cyclic voltammograms (CV) of NVO as cathode, full cell, anode in three-electrode configuration (vs. SCE) from −1.0 V to 0 V, −1.0 V to 1.0 V, and 0 V to 1.0 V respectively, at scan rate of 5 mVs$^{-1}$; (B) CV of LVO as anode in three-electrode configuration (vs. SCE) from −1.1 V to 0 V, at scan rate of 0.5 mVs$^{-1}$ and 2 mVs$^{-1}$; (C) CV of LVO as cathode in three-electrode configuration (vs. SCE) from 0 V to 1.1 V at scan rate of 2 mVs$^{-1}$; (D) CV of KVO as anode in three-electrode configuration (vs. SCE) from −0.5 V to 0 V, at scan rate of 2 mVs$^{-1}$; (E) CV of KVO in full cell range in three-electrode configuration (vs. SCE) from −0.6 V to 0.6 V, at scan rate of 2 mVs$^{-1}$. In the graphs, current (mA) is plotted against potential (V vs SCE).
Figure 5:
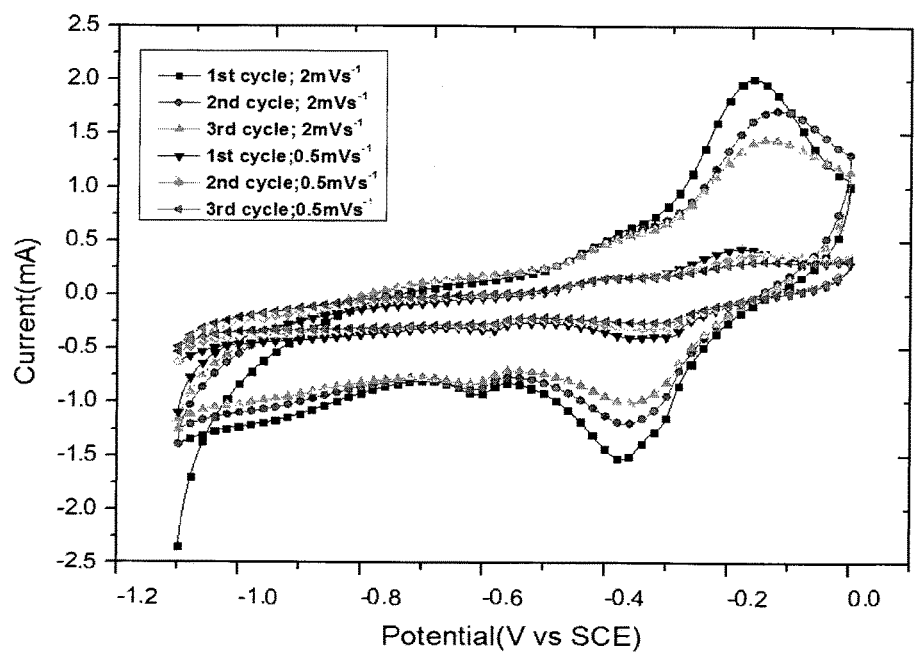
Figure 5:
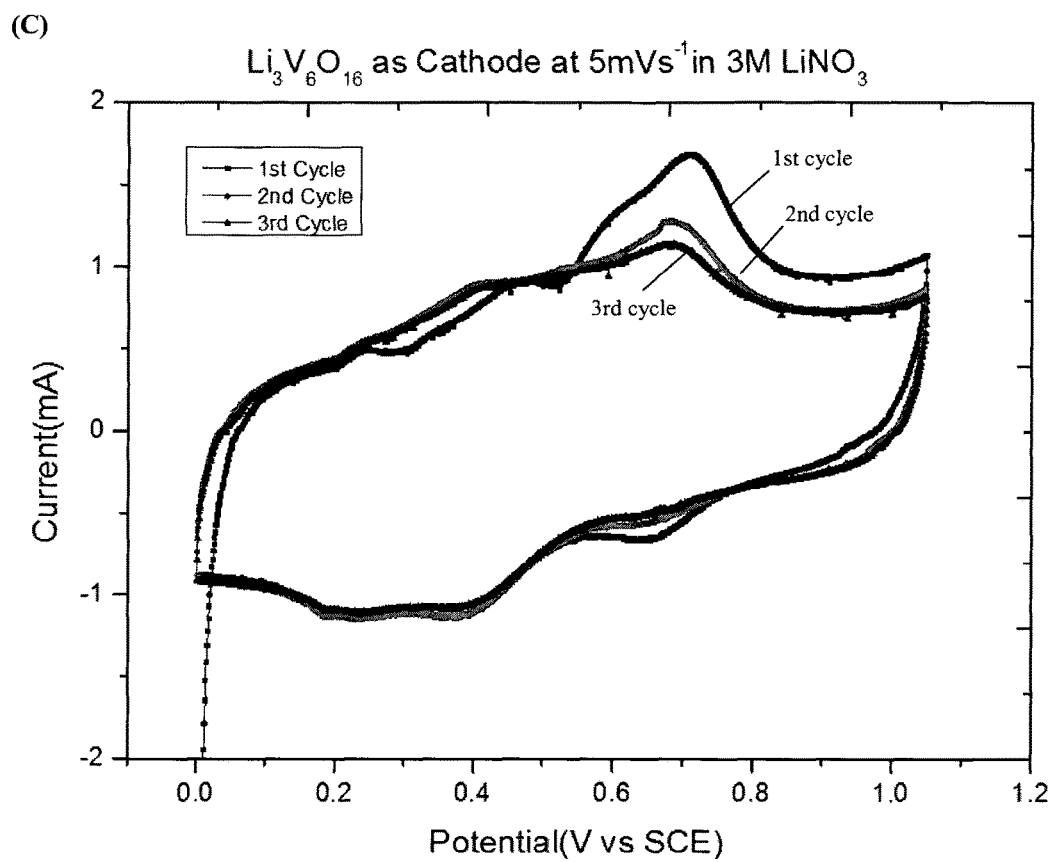
Figure 5:
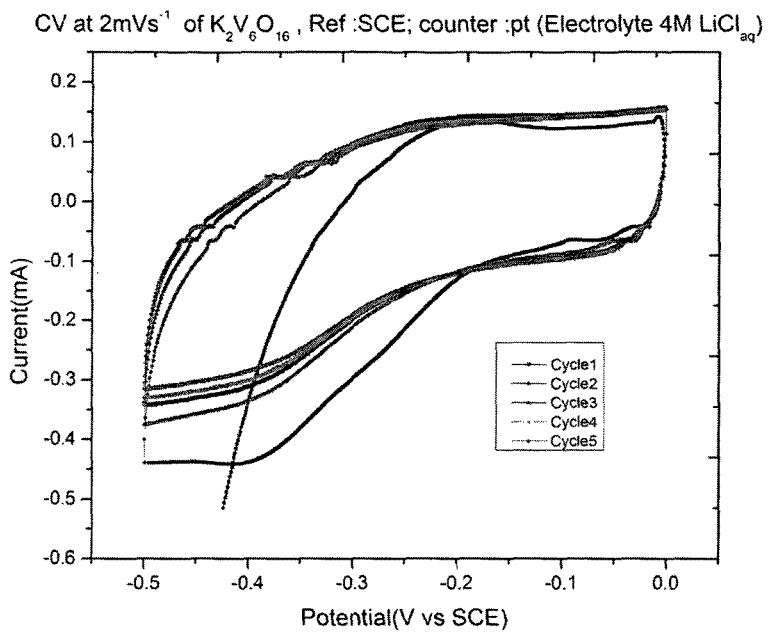
Figure 5:
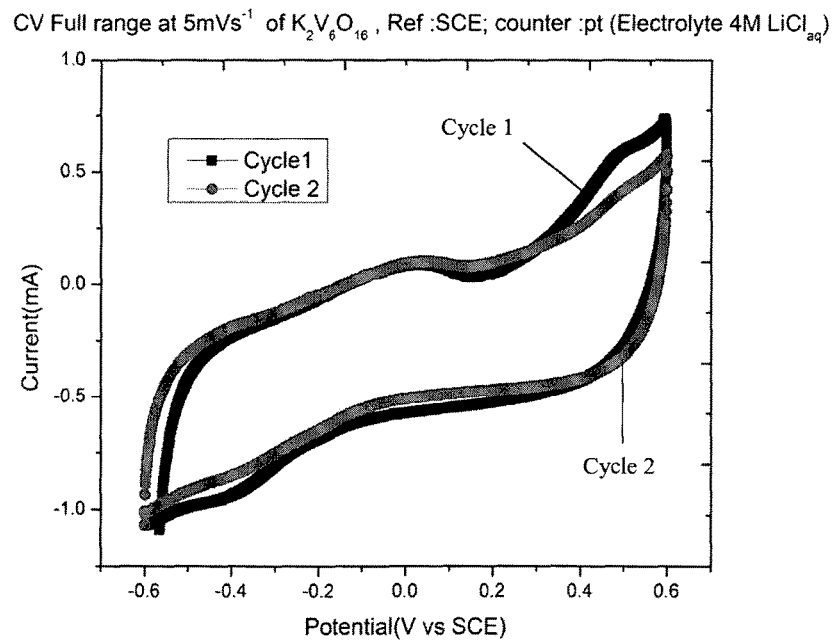
Figure 6:
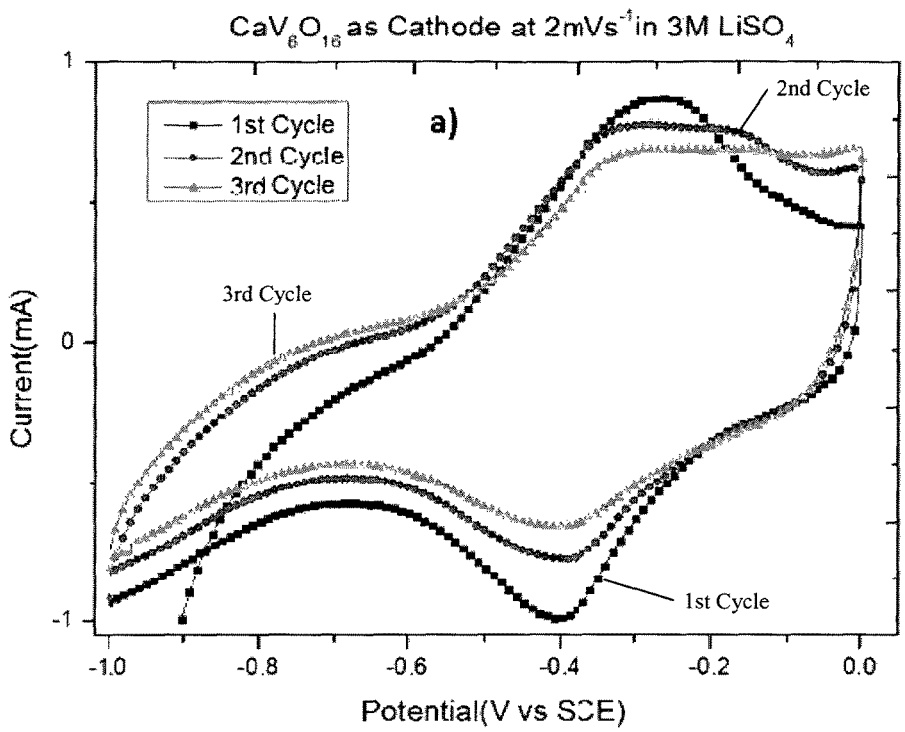
FIG. 6A to 6C are cyclic voltammograms (CV) of CVO as cathode, full cell, anode in three-electrode configuration (vs. SCE) from (A) −1.0 V to 0 V, (B) −1.0 V to 1.0 V and (C) 0 V to 1.0 V respectively, at scan rate of 2 mVs$^{-1}$, 5 mVs$^{-1}$, and 2 mVs$^{-1}$ respectively in 3 M LiSO$_4$. In the graphs, current (mA) is plotted against potential (V vs SCE).
Figure 6:
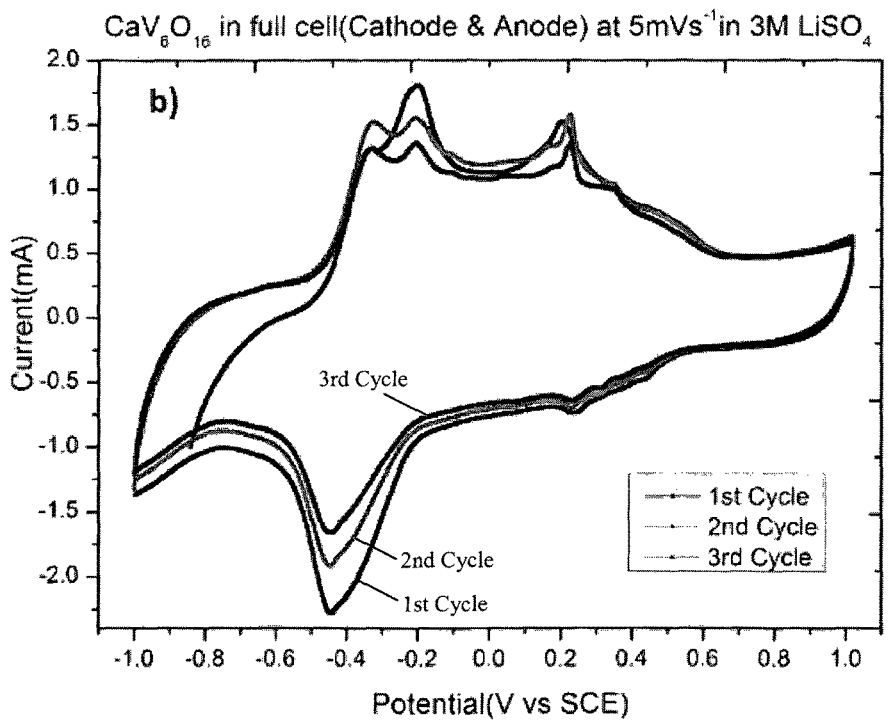
Figure 6:
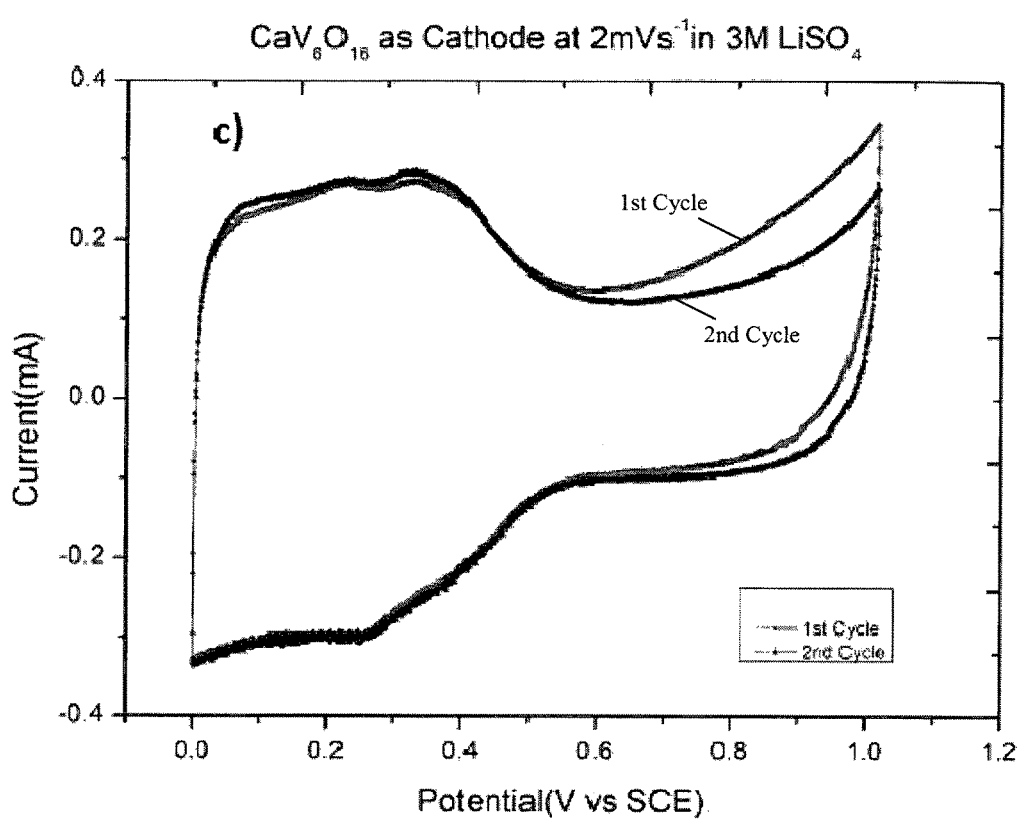

To further investigate electrochemical performance of NVO as cathode, anode, and symmetric full cell, cyclic voltammetric (CV) of NVO-400 was carried out in three-electrode configuration within the potential range of −1.0 to 0 V, 0 to 1.0 V and −1 to 1.0 V vs. SCE respectively, at a scan rate of 5mVs$^{-1}$ as shown in FIG. 5A. Higher heat-treatment temperature helped to improve the electrochemical properties and cyclic stability of the $Na_2V_6O_{16}$ active material. The complicated lithium intercalation/deintercalation behavior exhibited by the splitting in redox peaks was ascribed to the energy difference for lithium ions holding for different lithium sites.

The redox peak at about −0.5V may correspond to $V^{2+}$/$V^{3+}$ redox reaction 1.

$$V^{3+}+e^- \longleftrightarrow V^{2+} \qquad (1)$$

The redox peaks at about 0.5V correspond to redox reaction 2.

$$VO^{2+}+e+2 H^+ \longleftrightarrow V^{3+}+H_2O \qquad (2)$$

The CV curve of NVO//NVO symmetric full ARLB fabricated using 4 M LiCl in aqueous electrolyte studied between −1.0 to 1V vs. SCE showed 3 distinct redox couples with oxidation peaks at −0.58 V, −0.2 V, 0.6 V, and corresponding reduction peaks at −0.86 V, −0.5 V, 0.32 V vs. SCE respectively.

Complete full cell reaction may be written as follows:

$$VO^{2+} + e^- + 2H^+ \longleftrightarrow V^{2+} + H_2O \qquad (3)$$

In order to investigate phase transformations that occur during the electrochemical processes, cyclic voltammetric tests (FIG. 5) using the LVO rods as anode was carried out in three-electrode configuration within the potential range of −1.1 V to 0.0 V at a scan rate of 0.5 mVs$^{-1}$ and 2 mVs$^{-1}$.

In the anodic CV of LVO (FIG. 5B), two main reduction peaks may be observed at −0.4 V and −0.6 V, while a faint reduction peak may be observed at −0.3 V vs. SCE and two main oxidation peaks at −0.425 V and −0.275 V vs. SCE respectively.

In the cathodic CV of LVO (FIG. 5C), reduction occurs at 0.2 V, 0.4 V, and 0.65 V approximately, while oxidation occurs at 0.22 V, 0.43 V, and 0.7 V respectively. These peaks indicate lithium insertion (reduction)/de-insertion (oxidation) processes occurring during electrochemical charging/discharging. From the CV of KVO (FIG. 5D, 5E), one may observe that the current density peaks at respective voltages are not distinct, and the material behaves more like a supercapacitor. The CV curve of CVO//CVO symmetric full ARLB fabricated using 3 M Li$_2$SO$_4$ in aqueous electrolyte studied between −1.0 to 1 V vs. SCE showed 3 distinct redox couples with oxidation peaks at −0.4 V, −0.3 V, 0.2 V and corresponding reduction peaks at −0.45 V, 0.25 V vs. SCE respectively.

The electrochemical charge/discharge performance of LVO as anode was then evaluated as shown in FIG. 7A using three electrode configuration at a current density of 0.5 mAhg$^{-1}$. LVO as anode gave an initial charge capacity of 110 mAhg$^{-1}$ and discharge capacity of 120 mAhg$^{-1}$. All the specific capacity values are calculated with respect to the mass of the active material. LVO displayed a slightly higher anode capacity at a higher negative voltage window compared to other conventional anode materials like TiP$_2$O$_7$, LiT$_2$(PO$_4$)$_3$ and LiV$_3$O$_8$ in ARLBs. The charge discharge of LVO as cathode (FIG. 7B) gave a capacity of about 50 mAhg$^{-1}$.

Figure 7:
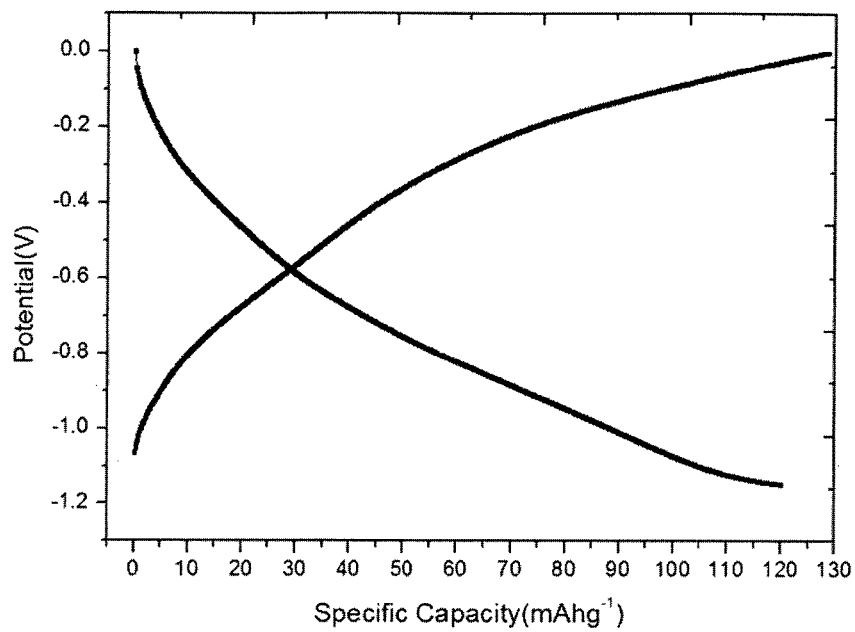
FIG. 7A to 7F are graphs showing galvanostatic charge-discharge profiles of (A) LVO as anode in three-electrode configuration (vs SCE) from −1.2 V to 0 V; (B) LVO as cathode in three-electrode configuration (vs SCE) from 0 V to 1 V; (C) NVO heat treated at 200° C., 300° C. and 400° C. respectively as anode in three-electrode configuration (vs SCE) from −1 V to 0 V; (D) NVO heat treated at 200° C., 300° C. and 400° C. respectively as cathode in three-electrode configuration (vs SCE) from 0 V to 1 V; (E) KVO as anode in three-electrode configuration (vs SCE) from −0.6 V to 0.0 V; and (F) full cell range in three-electrode configuration (vs SCE) from −0.6 V to 0.6 V in 4 M aqueous solution of LiCl at current density of 5 Ag$^{-1}$.
Figure 7:
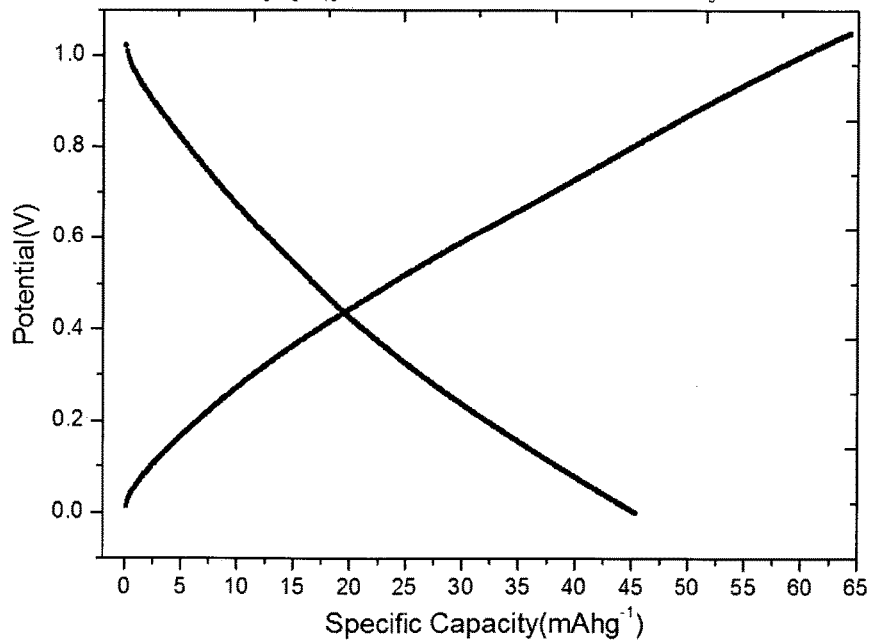
Figure 7:
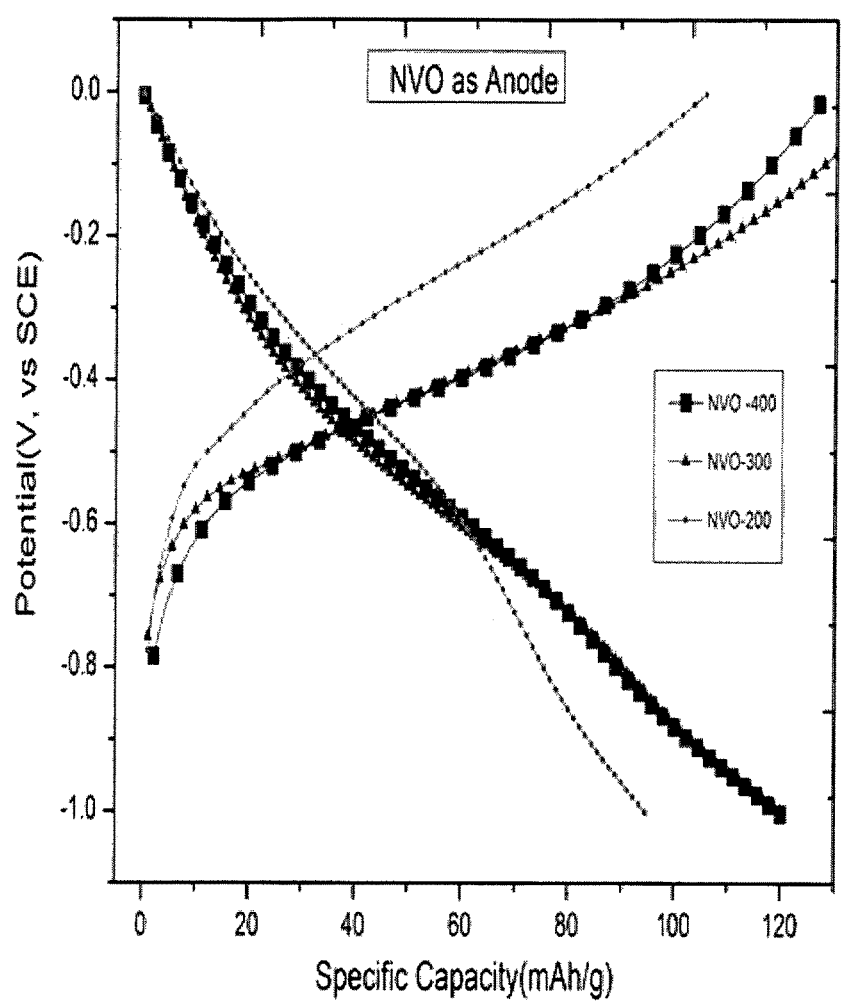
Figure 7:
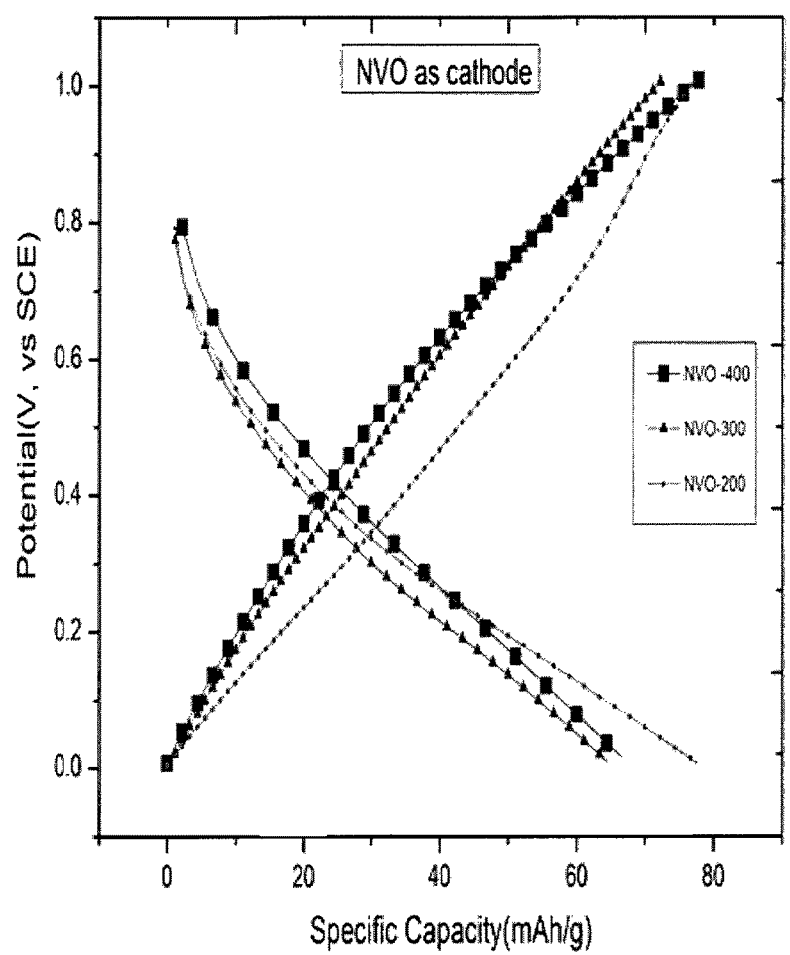
Figure 7:
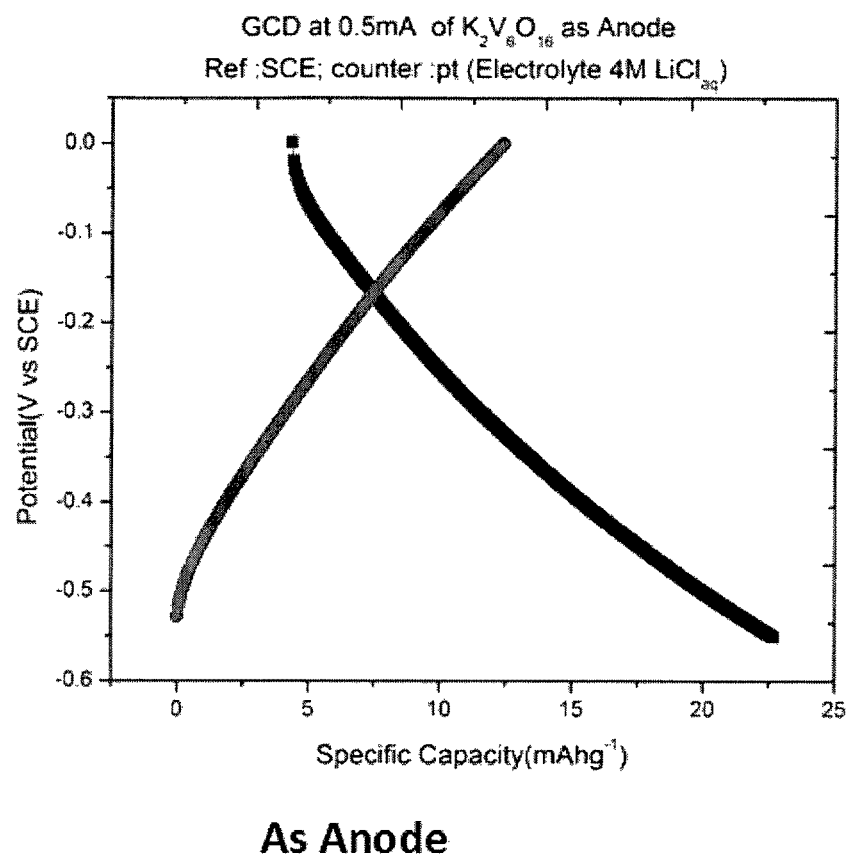
Figure 7:
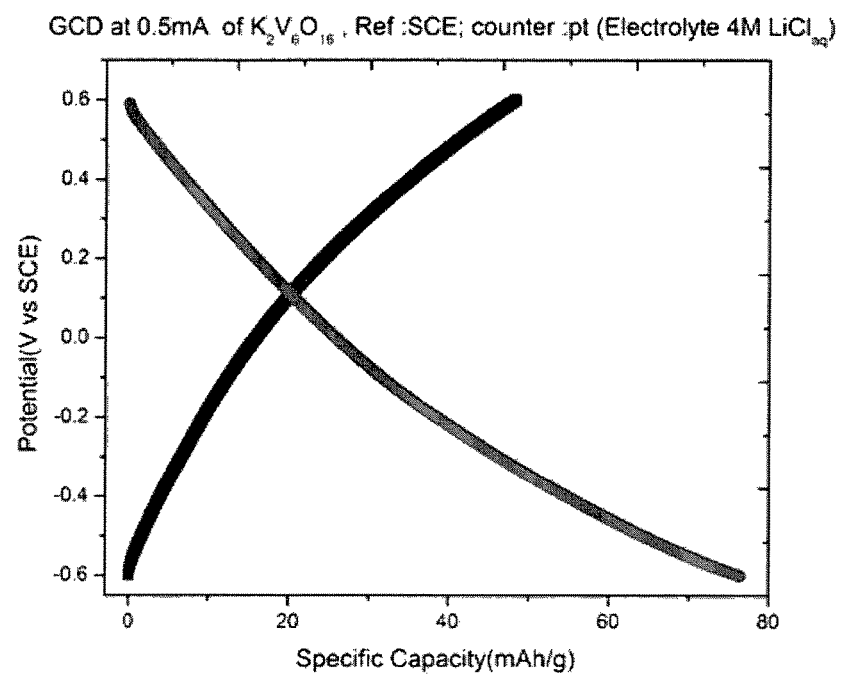

As shown in FIG. 7, half cell electrochemical performance of NVO as cathode and anode was further studied using galvanostatic charge/discharge cycles, in three electrode configuration, at a current density of 5 Ag$^{-1}$. NVO-200 as anode gave an initial charge capacity of 100 mAhg$^{-1}$ and discharge capacity of 98 mAhg$^{-1}$, while NVO-300 and NVO-400 as anode gave an initial charge capacity of about 130 mAhg$^{-1}$ and discharge capacity of about 121 mAhg$^{-1}$.

NVO-200 as cathode gave an initial charge capacity of about 80 mAhg$^{-1}$, and discharge capacity of about 80 mAhg$^{-1}$, while NVO-300 and NVO-400 as anode gave an initial charge capacity of about 80 mAhg$^{-1}$ and discharge capacity of about 80 mAhg$^{-1}$.

As observed in FIG. 7E and FIG. 7F, KVO as anode gave a capacity of 22.5 mAhg$^{-1}$ and 77.5 mAhg$^{-1}$ respectively. The charge-discharge plateau of KVO shows a behavior similar to that of a supercapacitor.

Figure 8:
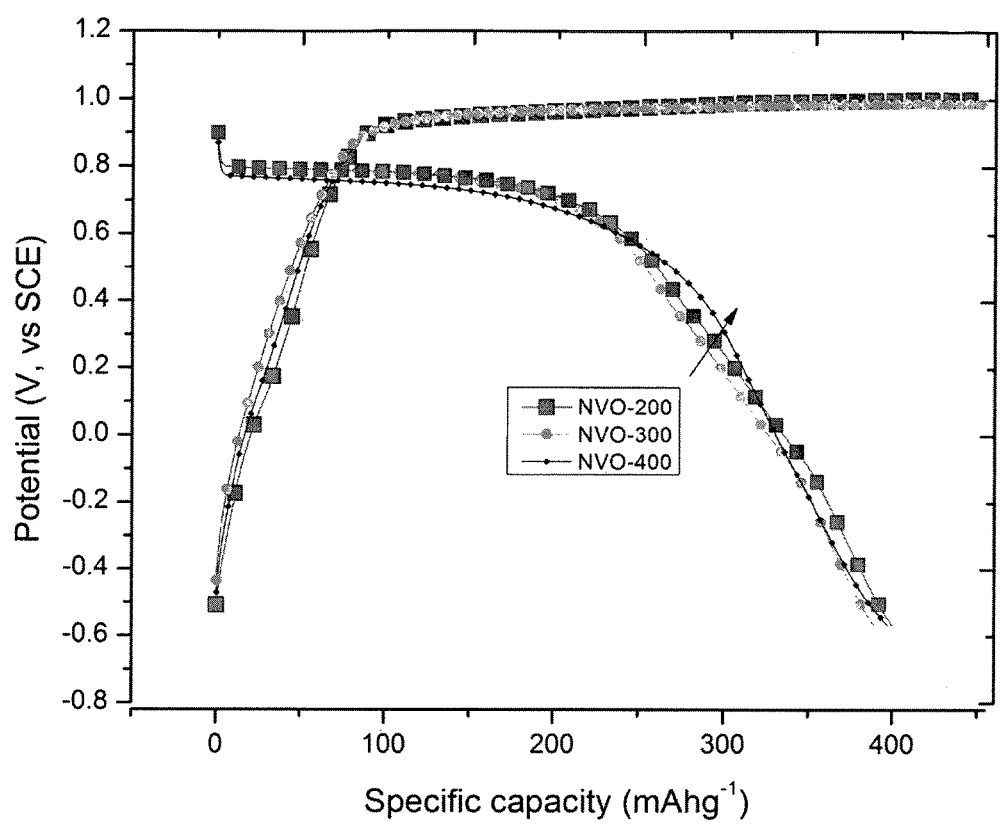
FIG. 8 is a graph showing galvanostatic charge-discharge profiles of NVO-200/NVO-200, NVO-300/NVO-300 and NVO-400/NVO-400 aqueous rechargeable lithium battery (ARLB) respectively, in three-electrode configuration (vs SCE) from −0.6 V to 1.28 V at current density of 5 Ag$^{-1}$. Y-axis: potential (V, vs SCE); x-axis: specific capacity (mAhg$^{-1}$).

Furthermore, the electrochemical properties of the NVO electrodes in a full cell configuration was evaluated via galvanostatic cycling, in three electrode configuration, at a high current density of 5 Ag$^{-1}$ between −0.6 V and 1.28 V, and the galvanostatic traces are presented in FIG. 8. During charge, a flat plateau may be observed at about 1.28V, vs. SCE, giving rise to initial charge capacity of about 450 mAhg$^{-1}$.

Subsequently, upon discharge, a slight plateau may be observed at about 1.0 Y and specific discharge capacity of about 400 mAhg$^{-1}$ was achieved. Charge and discharge plateaus were also observed at about 1.28 V and about 1.0 V respectively in NVO-300 and NVO-400. The initial specific charge capacities for NVO-200 and NVO-300 were about 450 mAhg$^{-1}$ and about 425 mAhg$^{-1}$ respectively, while the discharge capacity values obtained were about 395 mAhg$^{-1}$ and about 405 mAhg$^{-1}$. These capacity values are the highest reported for ARLBs, according to the inventors' knowledge.

Figure 4:
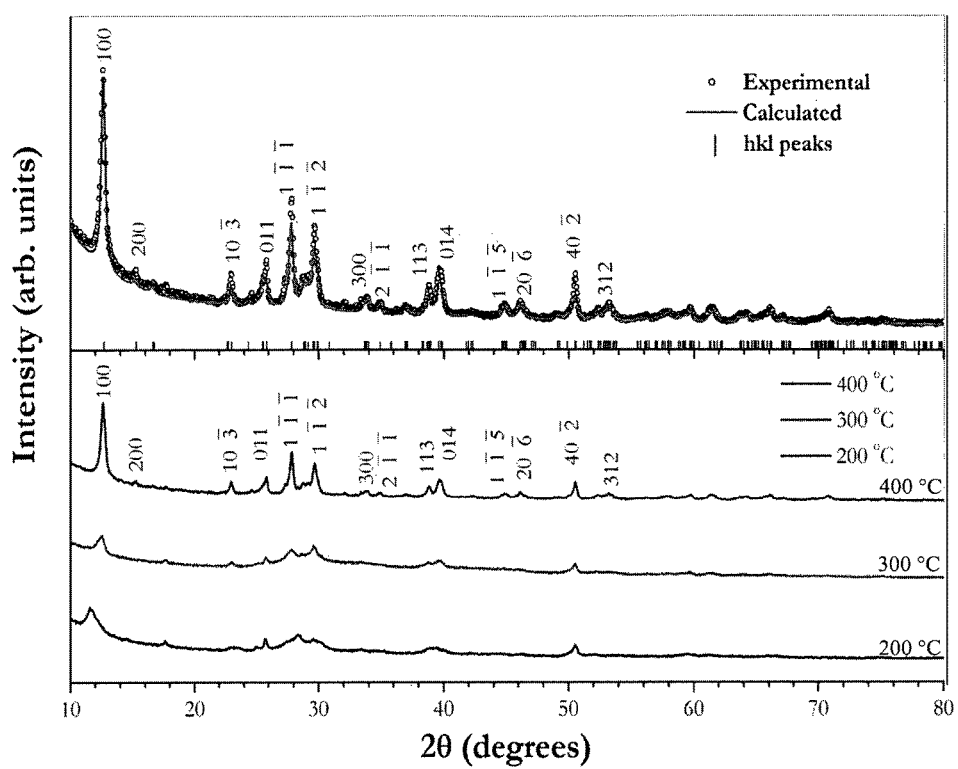
FIG. 4A to 4D are graphs depicting Rietveld refinement of X-ray diffraction (XRD) pattern of (A) NVO; (B) LVO; (C) $K_2V_6O_{16}$ (KVO); and (D) CVO. In the graphs, intensity (a.u.) is plotted against 2θ (degrees).
Figure 4:
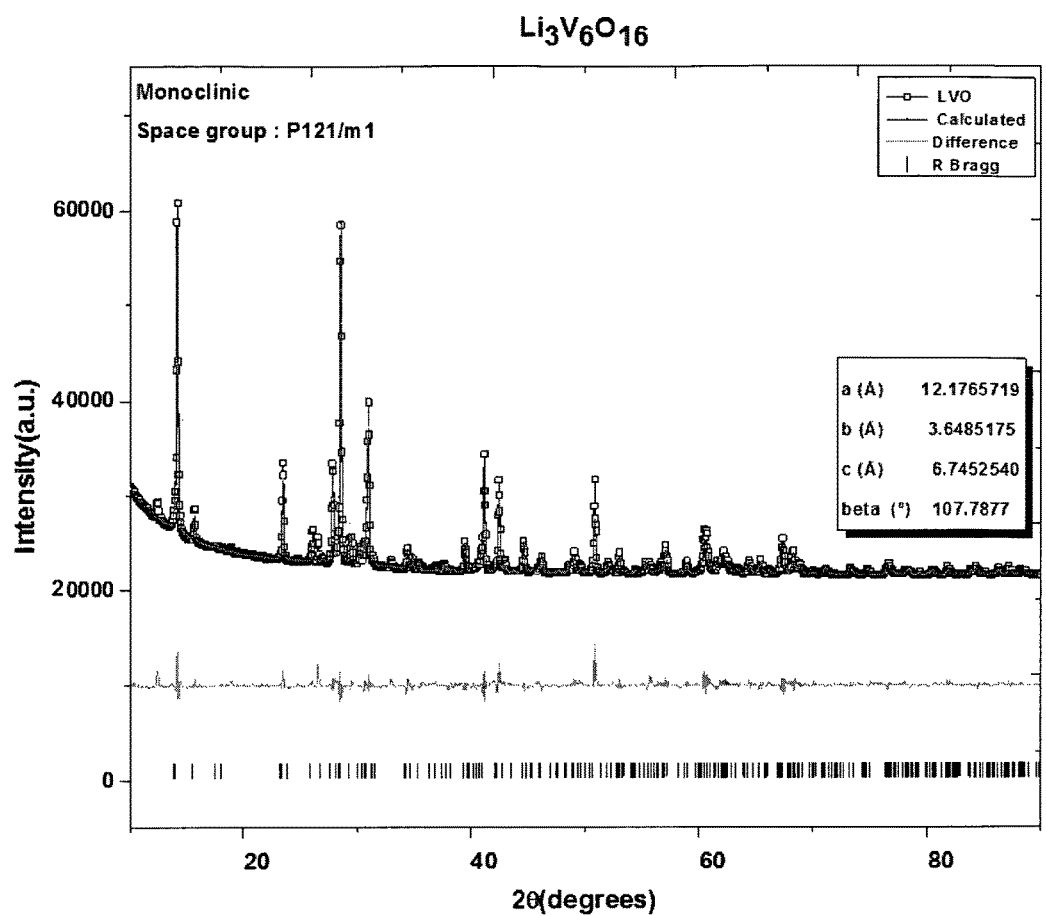
Figure 4:
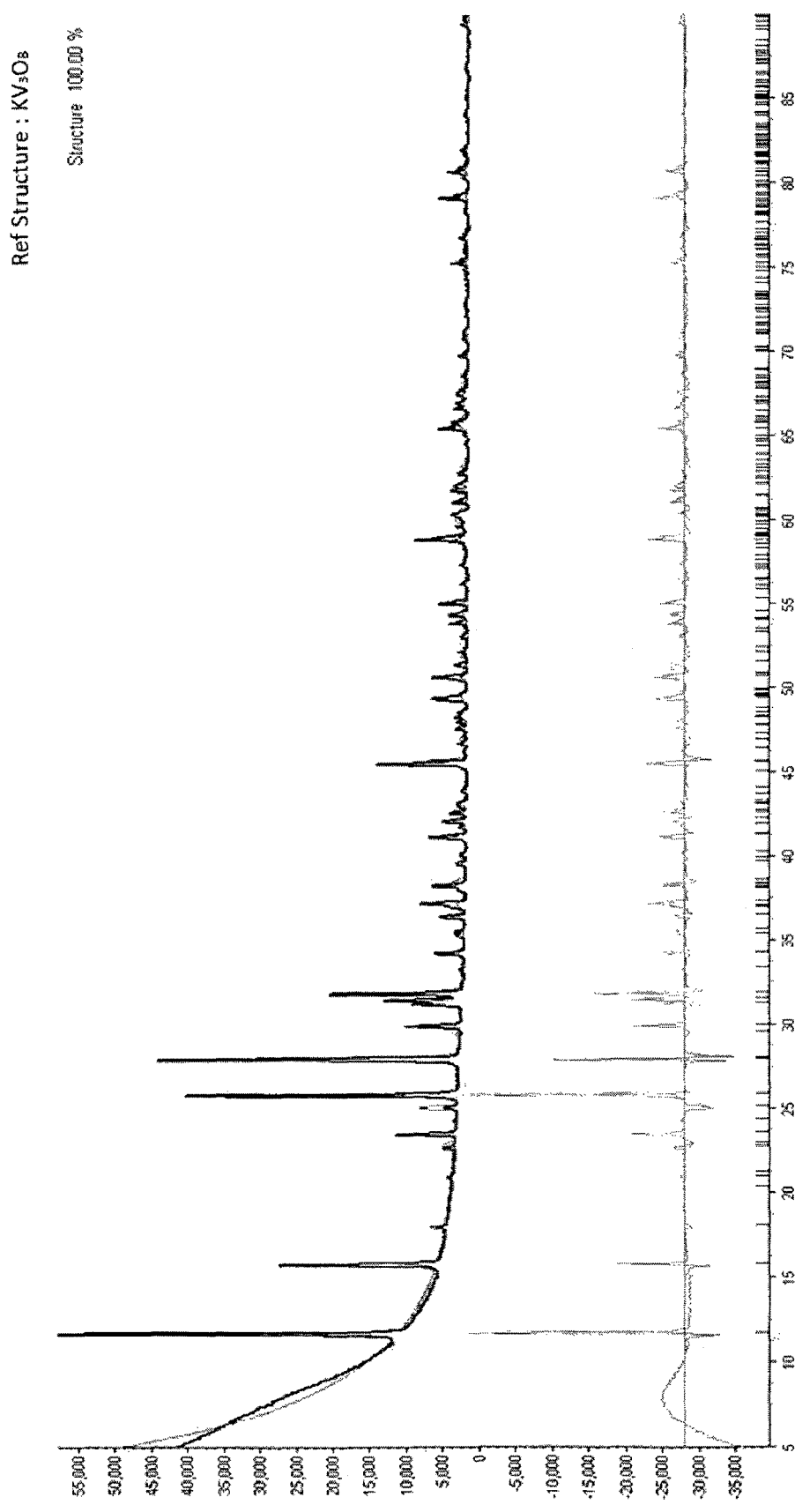
Figure 4:
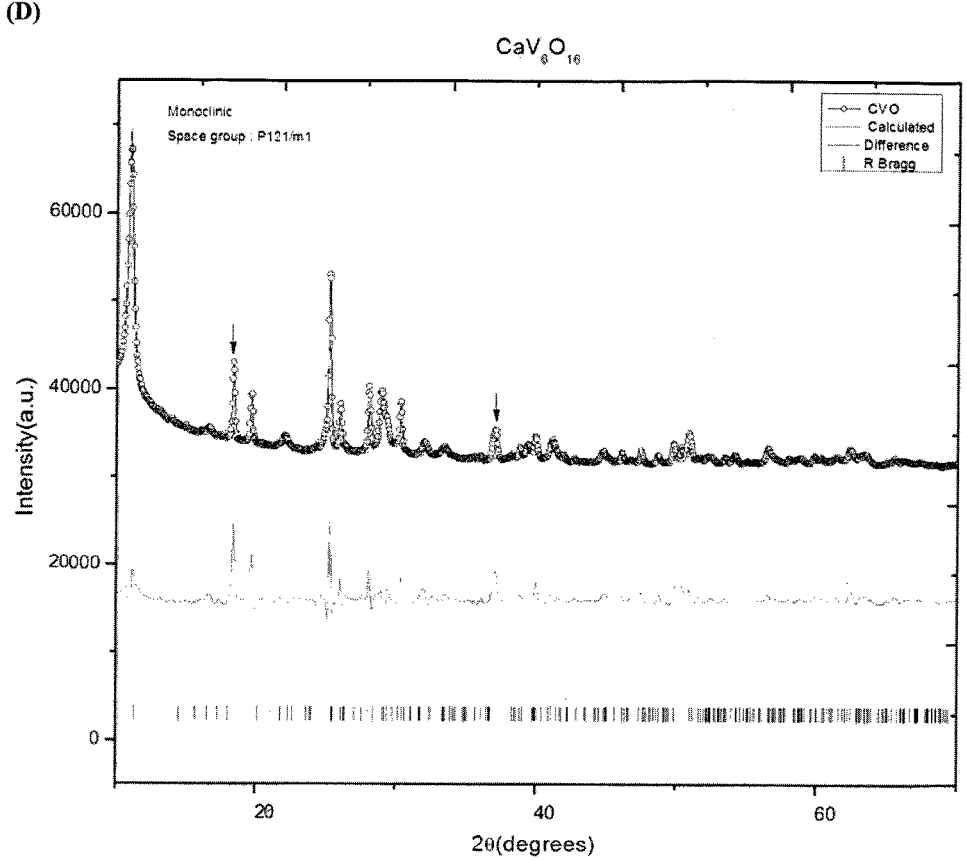
Figure 9:
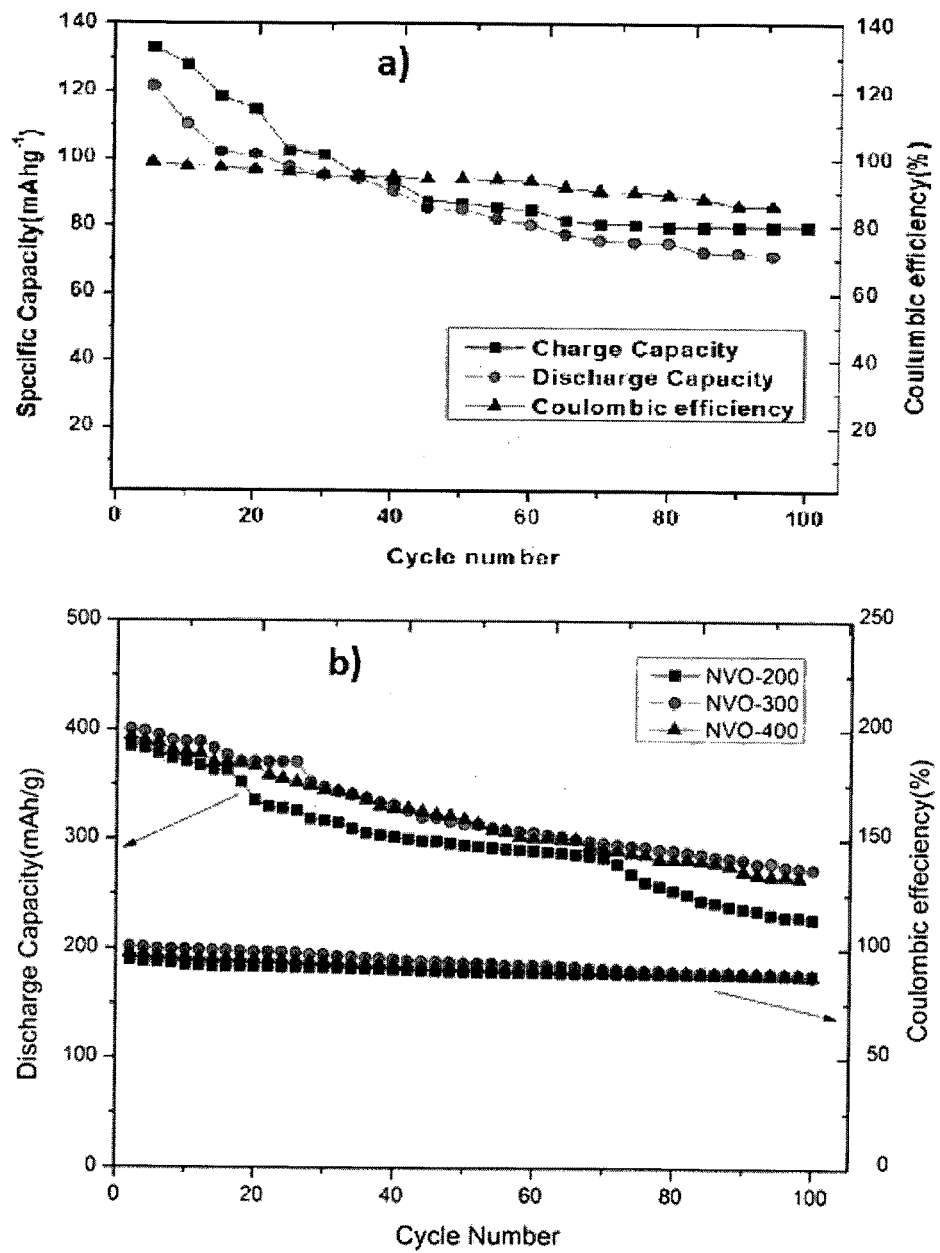
FIGS. 9A and 9B are graphs showing (A) specific capacity vs. cycle no. and coulombic efficiency of LVO in two-electrode configuration from −1.2 V to 0 V, at current density of 5 Ag$^{-1}$; (B) Specific capacity vs. cycle no. and coulombic efficiency of NVO-200/NVO-200, NVO-300/NVO-300 and NVO-400/NVO-400 ARLB respectively, in two-electrode configuration from −0.6 V to 1.28 V, at current density of 5 Ag$^{-1}$.

The cyclic stability of these active materials was further evaluated by prolonged cycling, up to 100 cycles, at 5 Ag$^{-1}$ (FIG. 9). The cyclic stability of these LVO active materials was further evaluated by prolonged cycling, up to 100 cycles, at 0.5 Ag$^{-1}$ as shown in FIG. 9A. Discharge capacity at the end of 100 cycles for LVO was 62.5 mAh g$^{-1}$, with about 52% equivalence to retention of initial capacity. Hence, the cyclic stability of LVO may be attributed to the higher surface area and higher crystallinity (larger crystal size) as evident from the TEM, AFM (FIG. 3) and XRD (FIG. 4). Addition of a different additive capable of causing modification of electrode surface or modulation of electrolyte pH may be used to slow down the capacity fading.

Increase in aspect ratio of the LVO rods leads to higher electro-active surface area and reduced ion diffusion path. This, in turn, improves mobility of lithium ions within the active material, enabling a larger number of lithium ions to intercalate into the active electrode material and occupy the vacant tetrahedral and octahedral sites in the crystal structure of LVO. Crystal structure, electrode porosity and composition of the materials also play a very important role in imparting high rate capabilities in anode materials.

The cyclic stability of these active materials was further evaluated by prolonged cycling, up to 100 cycles, at 5 Ag$^{-1}$ (FIG. 9B). Discharge capacity at the end of 100 cycles for NVO-200 was 240 mAhg$^{-1}$, equivalent to 60% retention of initial capacity, while NVO-300 and NVO-400 retained more than 70% and about 80% of the initial capacity respectively.

The initial rapid fading of the capacity observed in NVO-200 and NVO-300 may be attributed to their poorer crystallinity. A steep decrease in capacity of NVO-300 may be observed, but cyclic efficiency improves after the 10$^{th}$ cycle. The NVO-400 had an initial capacity of 400 mAhg$^{-1}$, but its capacity decreased to 360 mAhg$^{-1}$ at the 5th cycle from which 77% retention of this capacity was retained up to the 100$^{th}$ cycle. The cyclic stability of NVO-400, compared to NVO-200 and NVO-300 is superior and this may be attributed to the higher crystallinity (larger crystal size) as observed from the TEM (FIG. 3) and XRD (FIG. 4).

The pseudo-layered crystal structure of Na$_2$V$_6$O$_{16}$ facilitates the lithium insertion/deinsertion into and from the layers via the diffusion, while presence of sodium ions (Na$^+$) residing in the octahedral sites aids in maintaining the layered structure, by supporting the V$_3$O$_8$$^-$ puckered layers, during the electrochemical lithiation/delithiation processes, resulting in excellent electrochemical performance in terms of rate capability and cyclic stability. The superior electrochemical performance of NVO-400, among NVO-200 and NVO-300, may be attributed to the larger cell volume and crystal size.

It is postulated that appropriate heat treatment improves the crystallization of sodium vanadate compound NaV$_6$O$_{15}$, which was beneficial for the electrochemical performance.

As discussed above, novel one-dimensional nanostructured NVO, LVO, CVO and KVO have been synthesized by a facile hydrothermal method, followed by subsequent heat-treatment at suitable temperatures for optimum performance.

Characterization via field-emission scanning electron and transmission electron microscopies showed formation of rod/wire/belt-like structures with high aspect ratios of greater than 20. X-ray diffraction confirmed formation of 100% phase pure vanadate bronzes of NVO, LVO, CVO and KVO.

Application of NVO, both as cathode and anode material in an aqueous lithium ion battery, was used as exemplary embodiments for demonstration, and the electrochemical properties were studied via cyclic voltammetry and galvanostatic charge/discharge. High initial capacities of greater than 400 mAhg$^{-1}$ at high current rate were achieved. Upon cycling to 100 cycles, about 75% of initial capacity was retained, exhibiting superior rate performance and cycling stability of NVO. From the results obtained, it may be deduced that the layered structure of NVO, coupled with the presence of sodium ions, resulted in a stable structure, enabling the ease of lithium intercalation/deintercalation, leading to future applications of NVO as potential electrode material for aqueous lithium ion batteries. Similar studies have been performed with LVO, KVO and CVO to illustrate the functionality of these materials in aqueous rechargeable batteries.

The high-temperature-annealed $Na_2V_6O_{16}$, $Li_2V_6O_{16}$, $CaV_6O_{16}$ and $K_2V_6O_{16}$ has an initial capacity of about 400 mAhg$^{-1}$, about 120 mAhg$^{-1}$, about 200 mAhg$^{-1}$, and about 60 mAhg$^{-1}$ respectively, with more than 75%, 50%, 60%, and 90% retention of initial capacity over 100 charge/discharge cycles performed at 5 Ag$^{-1}$ respectively, exhibiting excellent cyclic stability and rate performance.

Example 8

Commercial Applications

The material production process may be easily scaled up to meet industrial scale productions levels. As the same material NVO, LVO, KVO and CVO may act as both cathode and anode, it removes the necessity of having a second material for the counter electrode. The battery may be used for hybrid-electric vehicle (HEV), as it fulfils all requirements of a HEV, such as safety, power density and rate capability. This battery in its flexible form may also be a good option for wearable devices, as the electrolyte used in these batteries are aqueous based and safe for operation compared to inflammable lithium ion and bulkier lead acid batteries.

Electrochemical performance of $Na_2V_6O_{16}$, $K_2V_6O_{16}$, $Li_2V_6O_{16}$, $CaV_6O_{16}$ nanofilaments or nanobelts as exemplary embodiments, which are synthesized by a hydrothermal method with subsequent annealing, have been thoroughly and systematically studied in aqueous LIBs (Lithium ion battery) as disclosed herein. Considering the wide operating potential window for $Na_2V_6O_{16}$, $K_2V_6O_{16}$, $Li_2V_6O_{16}$, $CaV_6O_{16}$ nanofilaments or nanobelts in aqueous electrolyte, where the vanadium oxide compounds are used in both cathode and anode of the electrochemical cell, this leads to a symmetric aqueous rechargeable lithium ion battery with excellent cycling stability and rate capabilities. Use of $Na_2V_6O_{16}$ nanofilaments as both cathode and anode for aqueous rechargeable battery (ARB) allows reduction in material cost and increases in process efficiency, as number of variables in battery manufacturing is reduced.

While the present invention has been particularly shown and described with reference to exemplary embodiments thereof, it will be understood by those of ordinary skill in the art that various changes in form and details may be made therein without departing from the spirit and scope of the present invention as defined by the following claims.

The invention claimed is:

1. A method of preparing a vanadium oxide compound of general formula (I)

$$M_nV_6O_{16} \qquad (I),$$

wherein M is selected from the group consisting of ammonium, alkali-metal, and alkaline-earth metal; and n is 1 or 2;
the method comprising heating a mixture comprising vanadium oxide and an alkaline solution of M under hydrothermal conditions to form the vanadium oxide compound.

2. The method according to claim 1, wherein M is selected from the group consisting of ammonium, sodium, potassium, lithium, calcium and magnesium.

3. The method according to claim 1, wherein the vanadium oxide compound is a nanostructured vanadium oxide compound comprising nanobelts, microrods, nanorods, nanofibers, or combinations thereof.

4. The method according to claim 3, wherein the nanobelts have an average diameter in the range of about 50 nm to about 100 nm.

5. The method according to claim 3, wherein the nanorods have an average length in the range of about 1 µm to about 10 µm.

6. The method according to claim 1, wherein the alkaline solution is a hydroxide or an acetate of M.

7. The method according to claim 1, wherein heating a mixture comprising vanadium oxide and an alkaline solution of M under hydrothermal conditions comprises heating the mixture in an autoclave at a temperature in the range of about 120° C. to about 300° C.

8. The method according to claim 1, further comprising drying the vanadium oxide compound at a temperature in the range of about 25° C. to about 120° C.

9. The method according to claim 1, further comprising calcination of the vanadium oxide compound at a temperature in the range of about 200° C. to about 400° C.

10. An electrochemical cell comprising an anode and a cathode, wherein the anode and the cathode independently comprise a vanadium oxide compound of general formula (I)

$$M_nV_6O_{16} \qquad (I),$$

wherein M is selected from the group consisting of ammonium, alkali-metal, and alkaline-earth metal; and n is 1 or 2.

11. The electrochemical cell according to claim 10, wherein M is selected from the group consisting of ammonium, sodium, potassium, lithium, calcium and magnesium.

12. The electrochemical cell according to claim 10, wherein the vanadium oxide compound is a nanostructured vanadium oxide compound comprising nanobelts, nanorods, microrods, nanofibers, or combinations thereof.

13. The electrochemical cell according to claim 12, wherein the nanobelts have an average diameter in the range of about 50 nm to about 100 nm.

14. The electrochemical cell according to claim 12, wherein the nanorods have an average length in the range of about 1 µm to about 10 µm.

15. The electrochemical cell according to claim 10, wherein the anode and the cathode independently further comprise a binder.

16. The electrochemical cell according to claim 10, wherein the anode and the cathode independently further comprise an electrically conductive agent.

17. The electrochemical cell according to claim 16, wherein the weight ratio of vanadium oxide compound: binder: electrically conductive agent is about 75:15:10.

18. The electrochemical cell according to claim 10, wherein the anode and the cathode have the same composition.

19. The electrochemical cell according to claim 10, wherein the electrochemical cell is an aqueous rechargeable battery.

20. An electrochemical cell comprising an anode and a cathode, wherein the anode and the cathode independently comprises $Li_3V_6O_{16}$.

* * * * *